US008325645B2

(12) United States Patent
Shiroko et al.

(10) Patent No.: US 8,325,645 B2
(45) Date of Patent: Dec. 4, 2012

(54) NETWORK RELAY APPARATUS

(75) Inventors: Norio Shiroko, Takamori (JP); Tetsu Okubo, Yokohama (JP); Shinji Nozaki, Kawasaki (JP)

(73) Assignee: Alaxala Networks Corporation, Kawasaki (JP)

( * ) Notice: Subject to any disclaimer, the term of this patent is extended or adjusted under 35 U.S.C. 154(b) by 325 days.

(21) Appl. No.: 12/834,636

(22) Filed: Jul. 12, 2010

(65) Prior Publication Data

US 2011/0013551 A1 Jan. 20, 2011

(30) Foreign Application Priority Data

Jul. 14, 2009 (JP) .................................. 2009-165782

(51) Int. Cl.
*H04H 20/71* (2008.01)
(52) U.S. Cl. ... 370/312; 370/390; 370/392; 370/395.31; 370/401; 370/432
(58) Field of Classification Search .................. 370/312, 370/390, 392, 295.31, 401, 432
See application file for complete search history.

(56) References Cited

U.S. PATENT DOCUMENTS

| | | | | |
|---|---|---|---|---|
| 6,266,339 B1 * | 7/2001 | Donahue et al. | ............. | 370/432 |
| 7,487,509 B2 * | 2/2009 | Hugly et al. | .................. | 719/310 |
| 7,499,458 B2 * | 3/2009 | McDysan et al. | ............. | 370/396 |
| 7,508,827 B2 * | 3/2009 | Kawamura | .................. | 370/390 |
| 7,788,368 B1 * | 8/2010 | Scano et al. | .................. | 709/224 |
| 2003/0130832 A1 * | 7/2003 | Schulter et al. | ................. | 703/23 |
| 2006/0209787 A1 | 9/2006 | Okuda | | |
| 2008/0056275 A1 * | 3/2008 | Smiljanic | ................. | 370/395.41 |
| 2008/0075078 A1 | 3/2008 | Watanabe | | |
| 2010/0131996 A1 * | 5/2010 | Gauld | ........................... | 725/100 |

FOREIGN PATENT DOCUMENTS

| | | |
|---|---|---|
| JP | 2006-261805 | 9/2006 |
| JP | 2008-079175 | 4/2008 |

OTHER PUBLICATIONS

Cain, B., et al.; Internet Group Management Protocol, Version 3; RFC 3376; 2002; pp. 1-53.
Vida, R., et al.; Multicast Listener Discovery Version 2 (MLDv2) for IPv6; RFC 3810; 2004; pp. 1-62.
Estrin, D., et al.; Protocol Independent Multicast-Sparse Mode (PIM-SM) : Protocol Specification; RFC 2362; 1998; pp. 1-66.
Load Splitting IP Multicast Traffic over ECMP; Oct. 2, 2009; CISCO; pp. 1-22.
Thaler, David G. et al.; Using Name-Based Mappings to increase Hit Rates; IEEE/ACM Transactions on Networking, vol. 6, No. 1, Feb. 1998; pp. 1-14.

* cited by examiner

*Primary Examiner* — Ayaz Sheikh
*Assistant Examiner* — Andrew C Lee
(74) *Attorney, Agent, or Firm* — Foley & Lardner LLP

(57) ABSTRACT

Network relay apparatus includes: relay apparatus selector configured to, in response to reception of a join request for a preset multicast group from an external device connecting with the network, refer to information for identifying respective network relay apparatuses on a segment which the own network relay apparatus belongs to, and, at least one of information for identifying the preset multicast group and information for identifying a source, wherein the information for identifying the preset multicast group and the information for identifying a source are included in the received join request, and unequivocally select one network relay apparatus among at least part of the network relay apparatuses on the segment as a designated network relay apparatus according to a predetermined rule, wherein the designated network relay apparatus is assigned to relay a multicast packet to the external device; and a multicast route setter.

15 Claims, 18 Drawing Sheets

| MULTICAST ROUTE | | RELAY APPARATUS IP ADDRESS |
|---|---|---|
| GROUP ADDRESS | SOURCE ADDRESS | |
| 226.1.100.5 | 200.148.25.13 | 142.18.45.4 |
| 226.1.200.100 | 213.160.1.11 | 142.18.45.5 |

| RELAY APPARATUS IP ADDRESS | GROUP PREFIX | | PRIORITY |
|---|---|---|---|
| | GROUP ADDRESS | PREFIX LENGTH | |
| 142.18.45.4 | 226.1.100.0 | 24 | 1 |
| 142.18.45.4 | 226.1.200.0 | 24 | 2 |
| 142.18.45.5 | 227.0.0.0 | 8 | 1 |
| 142.18.45.6 | 224.0.0.0 | 4 | 2 |

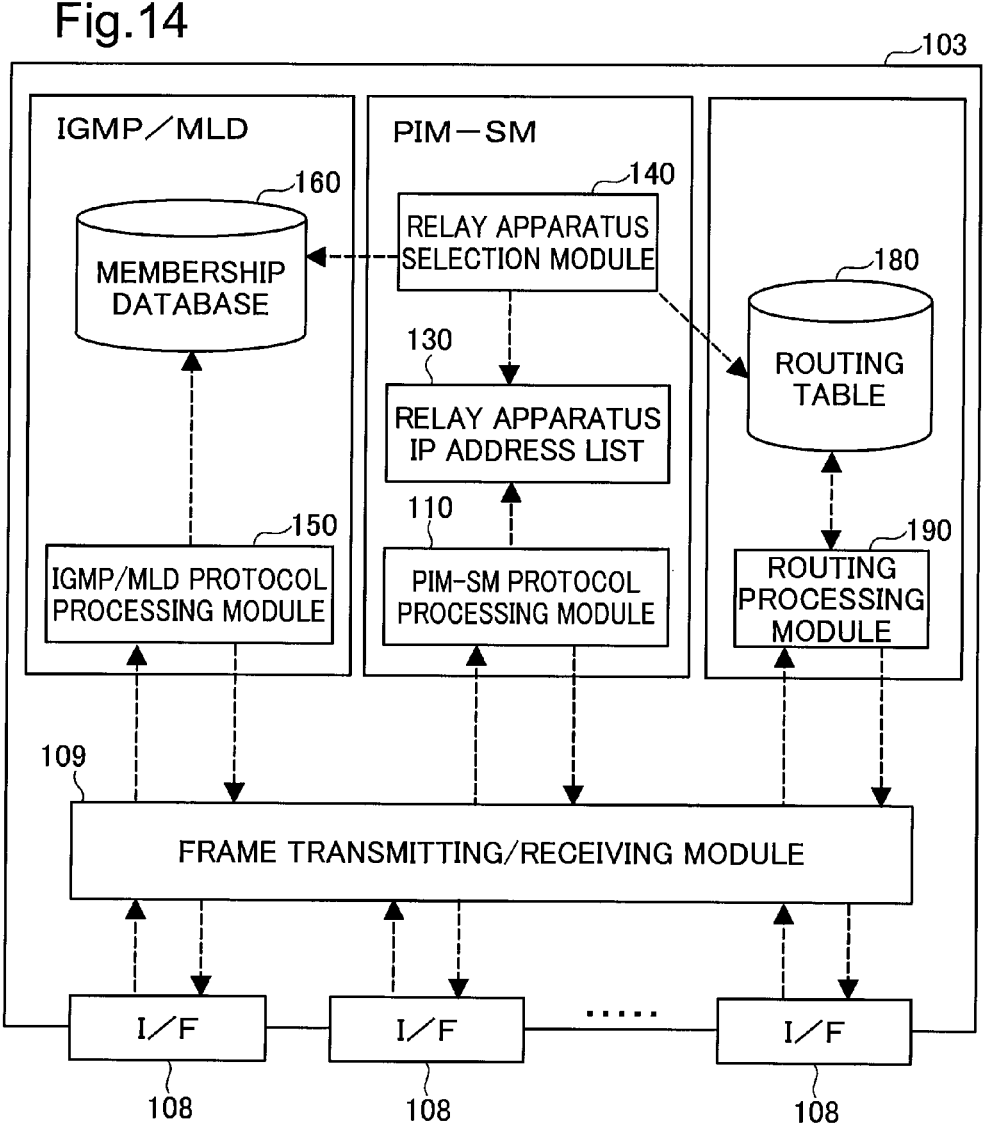

MEMBERSHIP DATABASE                                              160

| RECEIVING I/F | VLAN | MULTICAST GROUP ADDRESS | ... |
|---|---|---|---|
| 108 | 10 | G1 | ... |
| — | — | — | ... |
| — | — | — | ... |

Fig. 18

FORWARDING TABLE 780

| INPUT VLAN | DESTINATION MAC ADDRESS | OUTPUT INFORMATION | | OUTPUT INFORMATION | | ... |
| --- | --- | --- | --- | --- | --- | --- |
| | | OUTPUT I/F | OUTPUT VLAN | OUTPUT I/F | OUTPUT VLAN | |
| 10 | M1 | 715 | 10 | — | — | ... |
| — | — | — | — | — | — | ... |
| — | — | — | — | — | — | ... |

Fig. 19A

FORWARDING TABLE 780

| INPUT VLAN | DESTINATION MAC ADDRESS | OUTPUT INFORMATION | | OUTPUT INFORMATION | | ... |
| --- | --- | --- | --- | --- | --- | --- |
| | | OUTPUT I/F | OUTPUT VLAN | OUTPUT I/F | OUTPUT VLAN | |
| 10 | M1 | 715 | 10 | — | — | ... |
| — | — | — | — | — | — | ... |
| — | — | — | — | — | — | ... |

Fig. 19B

FORWARDING TABLE 780

| INPUT VLAN | DESTINATION MAC ADDRESS | OUTPUT INFORMATION | | OUTPUT INFORMATION | | ... |
| --- | --- | --- | --- | --- | --- | --- |
| | | OUTPUT I/F | OUTPUT VLAN | OUTPUT I/F | OUTPUT VLAN | |
| 10 | M1 | 715 | 10 | — | — | ... |
| 20 | M1 | 716 | 20 | — | — | ... |
| — | — | — | — | — | — | ... |

Fig.21A

MEMBERSHIP DATABASE 160

| RECEIVING I/F | VLAN | MULTICAST GROUP ADDRESS | ... |
|---|---|---|---|
| 108 | 10 | G1 | ... |
| — | — | — | ... |
| — | — | — | ... |

Fig.21B

MEMBERSHIP DATABASE 160

| RECEIVING I/F | VLAN | MULTICAST GROUP ADDRESS | ... |
|---|---|---|---|
| 108 | 10 | G1 | ... |
| 108 | 20 | G1 | ... |
| — | — | — | ... |

Fig.22A

ROUTING TABLE 180

| MULTICAST GROUP ADDRESS | OUTPUT INFORMATION | | OUTPUT INFORMATION | | ... |
| --- | --- | --- | --- | --- | --- |
| | OUTPUT I/F | OUTPUT VLAN | OUTPUT I/F | OUTPUT VLAN | |
| G1 | 108 | 10 | — | — | ... |
| — | — | — | — | — | ... |
| — | — | — | — | — | ... |

Fig.22B

ROUTING TABLE 180

| MULTICAST GROUP ADDRESS | OUTPUT INFORMATION | | OUTPUT INFORMATION | | ... |
| --- | --- | --- | --- | --- | --- |
| | OUTPUT I/F | OUTPUT VLAN | OUTPUT I/F | OUTPUT VLAN | |
| G1 | 108 | 10 | 108 | 20 | ... |
| — | — | — | — | — | ... |
| — | — | — | — | — | ... |

Fig.22C

ROUTING TABLE 180

| MULTICAST GROUP ADDRESS | OUTPUT INFORMATION | | OUTPUT INFORMATION | | ... |
| --- | --- | --- | --- | --- | --- |
| | OUTPUT I/F | OUTPUT VLAN | OUTPUT I/F | OUTPUT VLAN | |
| G1 | 108 | 30 | — | — | ... |
| — | — | — | — | — | ... |
| — | — | — | — | — | ... |

Fig.23A

FORWARDING TABLE 780

| INPUT VLAN | DESTINATION MAC ADDRESS | OUTPUT INFORMATION | | OUTPUT INFORMATION | | ... |
|---|---|---|---|---|---|---|
| | | OUTPUT I/F | OUTPUT VLAN | OUTPUT I/F | OUTPUT VLAN | |
| 10 | M1 | 715 | 10 | — | — | ... |
| 20 | M1 | 716 | 20 | — | — | ... |
| — | — | — | — | — | — | ... |

Fig.23B

FORWARDING TABLE 780

| INPUT VLAN | DESTINATION MAC ADDRESS | OUTPUT INFORMATION | | OUTPUT INFORMATION | | ... |
|---|---|---|---|---|---|---|
| | | OUTPUT I/F | OUTPUT VLAN | OUTPUT I/F | OUTPUT VLAN | |
| — | — | — | — | — | — | ... |
| — | — | — | — | — | — | ... |
| 30 | M1 | 715 | 10 | 716 | 20 | ... |

NETWORK RELAY APPARATUS

CROSS-REFERENCE TO RELATED APPLICATIONS

The present application claims the priority based on Japanese Patent Application No. 2009-165782 filed on Jul. 14, 2009, the disclosure of which is hereby incorporated by reference in its entirety.

BACKGROUND OF THE INVENTION

1. Field of the Invention

The present invention relates to a network relay apparatus.

2. Description of the Related Art

Various IP (Internet Protocol) multicast techniques have been proposed to allow a network relay apparatus to relay a multicast packet delivered from a delivery server to multiple receiving terminals. One of the proposed techniques is specifically adopted in a network configuration where multiple network relay apparatuses connect with one identical segment, in order to prevent the respective network relay apparatuses from individually relaying a multicast packet and thereby making multiple deliveries of the same multicast packet on the identical segment. One exemplified procedure of the proposed technique selects one network relay apparatus as a DR (designated router) among multiple network relay apparatuses connecting with one identical segment and specifies the selected DR network relay apparatus as a designated network relay apparatus assigned to relay a multicast packet to a receiving terminal.

With the recent spread of IPTVs (Internet Protocol Televisions) based on the IP multicast technique, remarkable increases of multicast groups and sources and a large increase of multicast packets to be transmitted are expected. This may result in increasing the processing load of the DR network relay apparatus. One known technique to overcome the load increase provides a distribution device between a receiving terminal and multiple network relay apparatuses to divide join requests for multicast groups from the receiving terminal, and thereby distributes the processing load applied by relay of multicast packets.

The above technique requires the distribution device located between the receiving terminal and the multiple network relay apparatuses on the same segment to divide the join requests for the multicast groups from the receiving terminal into the multiple network relay apparatuses. The installation of the distribution device undesirably increases the device cost and the operational cost.

SUMMARY

By taking into account the issue discussed above, in a network configuration where multiple network relay apparatuses are connected to one identical segment, there is a requirement for assuring distribution of the processing load applied by relay of multicast packets into the respective network relay apparatuses.

A first aspect to the present invention provides a network relay apparatus. The network relay apparatus according to the first aspect of the present invention includes: a relay apparatus selector configured to, in response to direct or indirect reception of a join request for a preset multicast group from an external device connecting with the network, refer to information for identifying respective network relay apparatuses on a segment which the own network relay apparatus belongs to, and, at least one of information for identifying the preset multicast group and information for identifying a source, wherein the information for identifying the preset multicast group and the information for identifying a source are included in the received join request, and unequivocally select one network relay apparatus among at least part of the network relay apparatuses on the segment as a designated network relay apparatus according to a predetermined rule, wherein the designated network relay apparatus is assigned to relay a multicast packet to the external device; and a setter configured, when the own network relay apparatus is selected as the designated network relay apparatus by the relay apparatus selector, to set a multicast route for relaying the multicast packet to the external device, and when the own network relay apparatus is not selected as the designated relay apparatus by the relay apparatus selector, not to set the multicast route for relaying the multicast packet to the external device.

According to the network relay apparatus of the first aspect of the present invention, the relay apparatus selector unequivocally selects one network relay apparatus among the multiple network relay apparatuses connecting with the same segment, as the designated network relay apparatus assigned to relay the multicast packet to the external device. The setter sets the multicast route, based on the result of selection by the relay apparatus selector. This arrangement assures distribution of the processing load applied by the relay of multicast packets into the respective network relay apparatuses.

The network relay apparatus according to the first aspect of the present invention may includes: upon detection of addition of another network relay apparatus on the segment, the relay apparatus selector refers to information for identifying respective network relay apparatuses on the segment including the added network relay apparatus, and at least one of information for identifying a multicast group which the external device participates in and information for identifying a source of delivering a multicast packet to be sent to the external device and selects again one network relay apparatus among all the network relay apparatuses on the segment including the added network relay apparatus, as the designated network relay apparatus assigned to relay the multicast packet to the external device.

According to the network relay apparatus of the first aspect of the present invention, the relay apparatus selector selects one network relay apparatus among the multiple network relay apparatuses on the same segment including the added network relay apparatus, as the designated network relay apparatus assigned to relay the multicast packet to the external device. This arrangement assures distribution of the processing load applied by the relay of multicast packets into the respective network relay apparatuses.

The network relay apparatus according to the first aspect of the present invention may includes: upon detection of stoppage of a network relay apparatus on the segment, the relay apparatus selector refers to information for identifying respective network relay apparatuses on the segment excluding the stopped network relay apparatus, and at least one of information for identifying a multicast group, which the external device articipates in and is allocated for multicast relay to the stopped network relay apparatus, and information for identifying a source of delivering a multicast packet to be sent to the external device and selects again one network relay apparatus among all the network relay apparatuses on the segment excluding the stopped network relay apparatus, as a designated network relay apparatus assigned to relay the multicast packet to the external device.

According to the network relay apparatus of the first aspect of the present invention, the relay apparatus selector selects one network relay apparatus among the multiple network relay apparatuses on the same segment excluding the stopped network relay apparatus, as the designated network relay apparatus assigned to relay the multicast packet to the external device. This arrangement assures distribution of the processing load applied by the relay of multicast packets into the respective network relay apparatuses.

The network relay apparatus according to the first aspect of the present invention may includes: in response to direct or indirect reception of a join request for a preset multicast group made by the external device from a downstream segment which the own network relay apparatus belongs to, the relay apparatus selector refers to information for identifying respective network relay apparatuses on an upstream segment which the own network relay apparatus belongs to, and at least one of information for identifying a multicast group and information for identifying a source, which are included in the received join request, and unequivocally selects one network relay apparatus among all the network relay apparatuses other than the own network relay apparatus on the upstream segment according to a predetermined rule, as a designated network relay apparatus assigned to relay a multicast packet to the external device.

According to the network relay apparatus of the first aspect of the present invention, the relay apparatus selector selects one network relay apparatus among the respective network relay apparatuses other than the own network relay apparatus on the upstream segment, as the designated network relay apparatus assigned to relay the multicast packet to the external device connecting with the downstream network. This arrangement assures distribution of the processing load applied by the relay of multicast packets into the respective network relay apparatuses.

The network relay apparatus according to the first aspect of the present invention may includes: upon detection of addition of another network relay apparatus on the upstream segment, the relay apparatus selector refers to information for identifying respective network relay apparatuses on the upstream segment including the added network relay apparatus, and at least one of information for identifying a multicast group which the external device participates in and information for identifying a source of delivering a multicast packet to be sent to the external device and selects again one network relay apparatus among all the network relay apparatuses other than the own network relay apparatus on the upstream segment including the added network relay apparatus, as the designated network relay apparatus assigned to relay the multicast packet to the external device.

According to the network relay apparatus of the first aspect of the present invention, the relay apparatus selector selects one network relay apparatus among the respective network relay apparatuses other than the own network relay apparatus on the upstream segment including the added network relay apparatus, as the designated network relay apparatus assigned to relay the multicast packet to the external device connecting with the downstream network. This arrangement assures distribution of the processing load applied by the relay of multicast packets into the respective network relay apparatuses.

The network relay apparatus according to the first aspect of the present invention may includes: upon detection of stoppage of a network relay apparatus on the upstream segment, the relay apparatus selector refers to information for identifying respective network relay apparatuses on the upstream segment excluding the stopped network relay apparatus, and at least one of information for identifying a multicast group, which the external device participates in and is allocated for multicast relay to the stopped network relay apparatus, and information for identifying a source of delivering a multicast packet to be sent to the external device and selects again one network relay apparatus among all the network relay apparatuses other than the own network relay apparatus on the upstream segment excluding the stopped network relay apparatus, as a designated network relay apparatus assigned to relay the multicast packet to the external device.

According to the network relay apparatus of the first aspect of the present invention, the relay apparatus selector selects one network relay apparatus among the respective network relay apparatuses other than the own network relay apparatus on the upstream segment excluding the stopped network relay apparatus, as the designated network relay apparatus assigned to relay the multicast packet to the external device connecting with the downstream network. This arrangement assures distribution of the processing load applied by the relay of multicast packets into the respective network relay apparatuses.

The network relay apparatus according to the first aspect of the present invention may further includes: a first storage configured to store a correspondence list of correlating each network relay apparatus on the segment to information for identifying a multicast packet as an object of relay by the network relay apparatus, wherein when the correspondence list does not have any entry of a network relay apparatus correlated to information for identifying a multicast packet as a receiving object to be received by the external device, the relay apparatus selector performs selection of the designated network relay apparatus.

According to the network relay apparatus of the first aspect of the present invention, when the correspondence list does not have any entry specifying the designated network relay apparatus assigned to relay the multicast packet to the external device, the relay apparatus selector selects the designated network relay apparatus. This arrangement desirably reduces the selection load in the network relay apparatus.

The network relay apparatus according to the first aspect of the present invention may further includes: a transmitter configured to, upon detection of addition of another network relay apparatus on the segment, send the correspondence list to the added network relay apparatus.

According to the network relay apparatus of the first aspect of the present invention, the added network relay apparatus can utilize the correspondence list to select a designated network relay apparatus assigned to relay a multicast packet to the external device. This arrangement desirably reduces the selection load in the added network relay apparatus.

The network relay apparatus according to the first aspect of the present invention may includes: upon detection of stoppage of a network relay apparatus on the segment, when the correspondence list includes information for identifying a multicast packet specified as an object of relay by the stopped network relay apparatus, the relay apparatus selector selects again only a designated relay apparatus assigned to relay the multicast packet specified as the object of relay by the stopped network relay apparatus.

According to the network relay apparatus of the first aspect of the present invention, when the correspondence list includes the information for identifying the multicast packet specified as the object of relay by the stopped network relay apparatus, the relay apparatus selector selects only the designated relay apparatus that succeeds to the assignment to relay the multicast packet specified as the object of relay by the stopped network relay apparatus. This arrangement desirably reduces the selection load in the network relay apparatus.

The network relay apparatus according to the first aspect of the present invention may includes: in response to direct or indirect reception of a join request for a preset multicast group made by the external device from a downstream segment which the own network relay apparatus belongs to, when the correspondence list does not have any entry of a network relay apparatus correlated to information for identifying a multicast packet as a receiving object to be received by the external device, the relay apparatus selector performs the selection of the designated network relay apparatus among all the network relay apparatuses other than the own network relay apparatus on an upstream segment.

According to the network relay apparatus of the first aspect of the present invention, when the correspondence list does not have any entry specifying the designated network relay apparatus assigned to relay the multicast packet to the external device connecting with the downstream network, the relay apparatus selector selects the designated network relay apparatus among the respective network relay apparatuses other than the own network relay apparatus on the upstream segment. This arrangement desirably reduces the selection load in the network relay apparatus.

The network relay apparatus according to the first aspect of the present invention may further includes: an updater configured to, in response to reception of a result of the selection of the designated network relay apparatus from another network relay apparatus on the downstream segment which the own network relay apparatus belongs to, adds the received result of the selection to the correspondence list stored in the own network relay apparatus.

According to the network relay apparatus of the first aspect of the present invention, the relay apparatus selector refers to the updated correspondence list and selects the designated network relay apparatus assigned to relay the multicast packet to the external device. This arrangement desirably reduces the selection load in the network relay apparatus.

The network relay apparatus according to the first aspect of the present invention may includes: upon detection of stoppage of a network relay apparatus on the upstream segment, when the correspondence list includes information for identifying a multicast packet specified as an object of relay by the stopped network relay apparatus, the relay apparatus selector selects again only a designated relay apparatus assigned to relay the multicast packet specified as the object of relay by the stopped network relay apparatus among all the network relay apparatuses other than the own network relay apparatus on the upstream segment excluding the stopped network relay apparatus.

According to the network relay apparatus of the first aspect of the present invention, when the correspondence list includes the information for identifying the multicast packet specified as the object of relay by the stopped network relay apparatus, the relay apparatus selector selects only the designated relay apparatus that succeeds to the assignment to relay the multicast packet specified as the object of relay by the stopped network relay apparatus, among the respective network relay apparatuses other than the own network relay apparatus on the upstream segment. This arrangement desirably reduces the selection load in the network relay apparatus.

The network relay apparatus according to the first aspect of the present invention may further includes: a second storage configured to store a selection list of correlating each network relay apparatus on the segment to a priority order of specification as the designated network relay apparatus assigned to relay the multicast packet to the external device, wherein the relay apparatus selector performs selection of the designated network relay apparatus according to the selection list.

According to the network relay apparatus of the first aspect of the present invention, the relay apparatus selector refers to the selection list and unequivocally selects one network relay apparatus among the multiple network relay apparatuses on the same segment, as the designated network relay apparatus assigned to relay the multicast packet to the external device. This arrangement desirably reduces the selection load in the network relay apparatus.

The network relay apparatus according to the first aspect of the present invention may includes: the relay apparatus selector performs selection of the designated network relay apparatus, based on computed values by hash computation from the at least one of the information for identifying the preset multicast group and the information for identifying the source and the information for identifying the respective network relay apparatuses.

According to the network relay apparatus of the first aspect of the present invention, the relay apparatus selector performs hash computation to give computed values from the at least one of the information for identifying the preset multicast group and the information for identifying the source and the information for identifying the respective network relay apparatuses, and selects one network relay apparatus among the multiple network relay apparatuses on the same segment, as the designated network relay apparatus assigned to relay the multicast packet to the external device, based on the computed values. This arrangement assures distribution of the processing load applied by the relay of multicast packets into the respective network relay apparatuses.

A second aspect to the present invention provides a network system. The network system according to the second aspect of the present invention includes: a forwarding device connected respectively with a first external device belonging to a first virtual network and with a second external device belonging to a second virtual network; and multiple network relay apparatuses belonging to one identical segment in each of the first virtual network and the second virtual network, each of the multiple network relay apparatuses comprising: a relay apparatus selector configured to, in response to direct or indirect reception of join requests for one identical multicast group from both the first external device and the second external device, refer to information for identifying respective network relay apparatuses in the first virtual network, and, at least one of information for identifying the multicast group and information for identifying a source, wherein the information for identifying the multicast group and the information for identifying a source are included in the received join requests, and unequivocally select one network relay apparatus among at least part of the network relay apparatuses as a designated network relay apparatus according to a predetermined rule, wherein the designated network relay apparatus is assigned to relay a multicast packet to the first external device and to the second external device; and a setter configured, when the own network relay apparatus is selected as the designated network relay apparatus by the relay apparatus selector, to set multicast routes for relaying the multicast packet to the first external device and to the second external device, and when the own network relay apparatus is not selected as the designated relay apparatus by the relay apparatus selector, not to set the multicast routes for relaying the multicast packet to the first external device and to the second external device.

According to the network system of the second aspect of the present invention, in the case of sequential reception of join requests for one identical multicast group from multiple external devices connecting with different virtual networks, the relay apparatus selector utilizes the information for identifying the respective network relay apparatuses in one virtual network and selects the designated network relay apparatus assigned to relay the multicast packet to the external device belonging to the other virtual network, as well as to the external device belonging to the own virtual network. This arrangement assures distribution of the processing load applied by the relay of multicast packets into the respective network relay apparatuses.

A third aspect to the present invention provides a network system. The network system according to the third aspect of the present invention includes: multiple network relay apparatuses connecting with one identical segment on a network; and an external device connecting with the network, each of the multiple network relay apparatuses comprising: a relay apparatus selector configured to, in response to direct or indirect reception of a join request for a preset multicast group from the external device, refer to information for identifying the multiple network relay apparatuses, and at least one of information for identifying the preset multicast group and information for identifying a source, wherein the information for identifying the preset multicast group and the information for identifying a source are included in the received join request, and unequivocally select one network relay apparatus among the multiple network relay apparatuses as a designated network relay apparatus according to a predetermined rule, wherein the designated network relay apparatus is assigned to relay a multicast packet to the external device; and a setter configured, when the own network relay apparatus is selected as the designated network relay apparatus by the relay apparatus selector, to set a multicast route for relaying the multicast packet to the external device, and when the own network relay apparatus is not selected as the designated relay apparatus by the relay apparatus selector, not to set the multicast route for relaying the multicast packet to the external device.

According to the network system of the third aspect of the present invention, even in a network configuration where multiple network relay apparatuses connect with one identical segment, the relay apparatus selector unequivocally selects the designated network relay apparatus assigned to relay the multicast packet to the external device among the multiple network relay apparatuses. The setter sets the multicast route, based on the result of selection by the relay apparatus selector. This arrangement assures distribution of the processing load applied by the relay of multicast packets into the respective network relay apparatuses.

The technique of the invention is not restricted to the network relay apparatus or the network system having any of the configurations discussed above, but may be actualized by diversity of other applications, for example, a multicast packet relay apparatus, a network relay method, computer programs executed to implement the functions of any of such relay apparatuses or the functional steps of the method, and recording media in which such computer programs are recorded. The network relay apparatus according to the invention may be applied, in combination with other members and components according to the requirements.

BRIEF DESCRIPTION OF THE DRAWINGS

FIG. 14 is an explanatory diagrammatic representation of the general structure of the relay apparatus according to the fifth embodiment;

FIG. 15 is an explanatory diagrammatic representation of the routing table;

FIG. 18 is an explanatory diagrammatic representation of the forwarding table;

FIGS. 19A and 19B are explanatory diagrammatic representations of the forwarding table with some information added;

FIGS. 21A and 21B are explanatory diagrammatic representations of the membership database with some information added;

FIGS. 22A through 22C are explanatory diagrammatic representations of the routing table with the additional setting of a multicast route; and FIGS. 23A and 23B are explanatory diagrammatic representations of the forwarding table with integration of information.

DESCRIPTION OF THE PREFERRED EMBODIMENT

Figure 1:
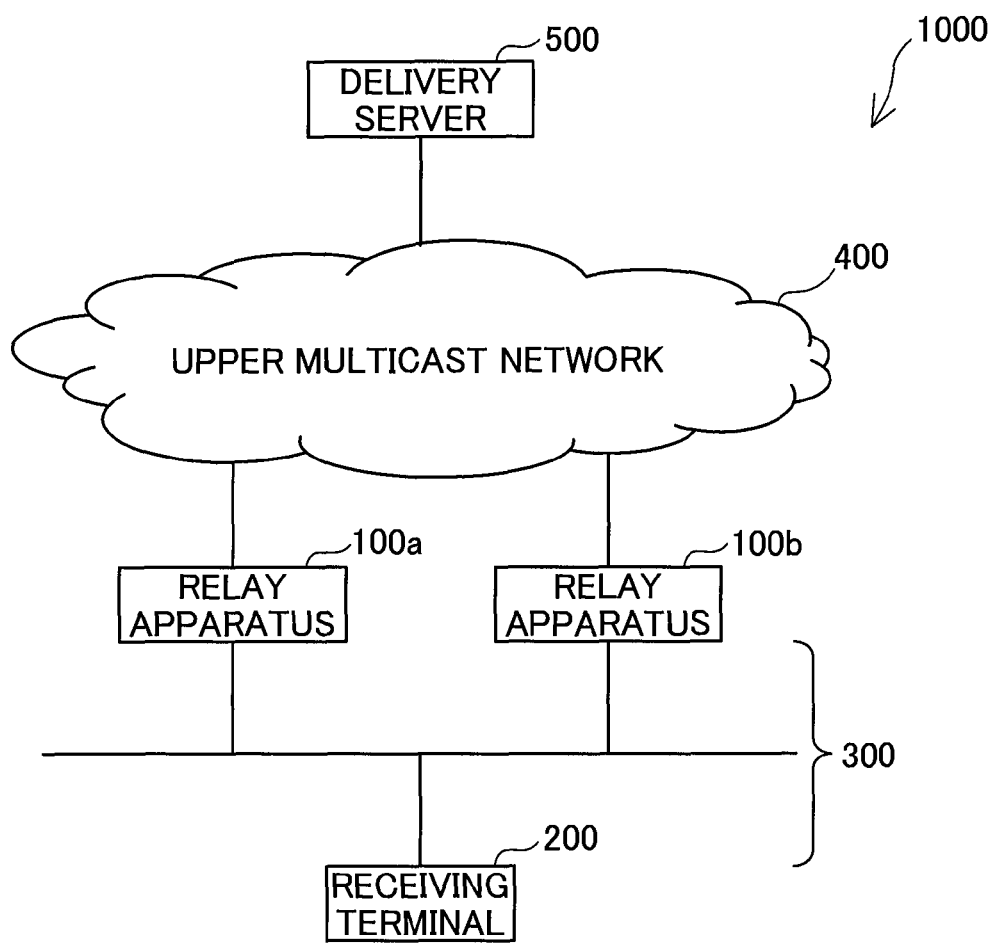
FIG. 1 is an explanatory diagrammatic representation of the general configuration of a network system including network relay apparatuses according to a first embodiment of the invention.

Next, aspects of the present invention will be described in the following order on the basis of embodiments:
A. First Embodiment
A1. Structure of Network Relay Apparatus FIG. 1 is an explanatory diagrammatic representation of the general configuration of a network system 1000 including network relay apparatuses according to a first embodiment of the invention. The network system 1000 has two network relay apparatuses 100 (hereafter may be simplified as 'relay apparatus'), a receiving terminal 200, an upper multicast network 400, and a delivery server 500. For the purpose of discrimination, the two relay apparatuses 100 may be expressed as the relay apparatuses 100a and 100b according to the requirements. The two relay apparatuses 100a and 100b and the receiving terminal 200 are connected to one identical segment 300. The relay apparatuses 100a and 100b are respectively connected to the upper multicast network 400, which connects with the delivery server 500, by means of segments different from the segment 300. The two relay apparatuses 100a and 100b are arranged in parallel with each other by the segment 300, so that a multicast packet delivered from the delivery server 500 goes through either the relay apparatus 100a or the relay apparatus 100b and, in either case, reaches the receiving terminal 200. Although the two relay apparatuses 100 and one receiving terminal 200 are connected in parallel to the segment 300 in the network configuration of this embodiment, three or more relay apparatuses 100 and two or more receiving terminals 200 may be connected in parallel to the segment 300. The delivery server 500 may be implemented as integration with the upper multicast network 400.

In the network configuration of this embodiment, IGMP (Internet Group Management Protocol) of IPv4 (IP version 4) or MLD (multicast Listener Discovery) of IPv6 (IP version 6) may be adopted as a protocol for multicast group address management between the receiving terminal 200 and the relay apparatuses 100. PIM-SM (Protocol Independent Multicast-Sparse Mode) or any other suitable protocol may be adopted as a protocol for multicast route control between the two relay apparatuses 100.

Figure 2:
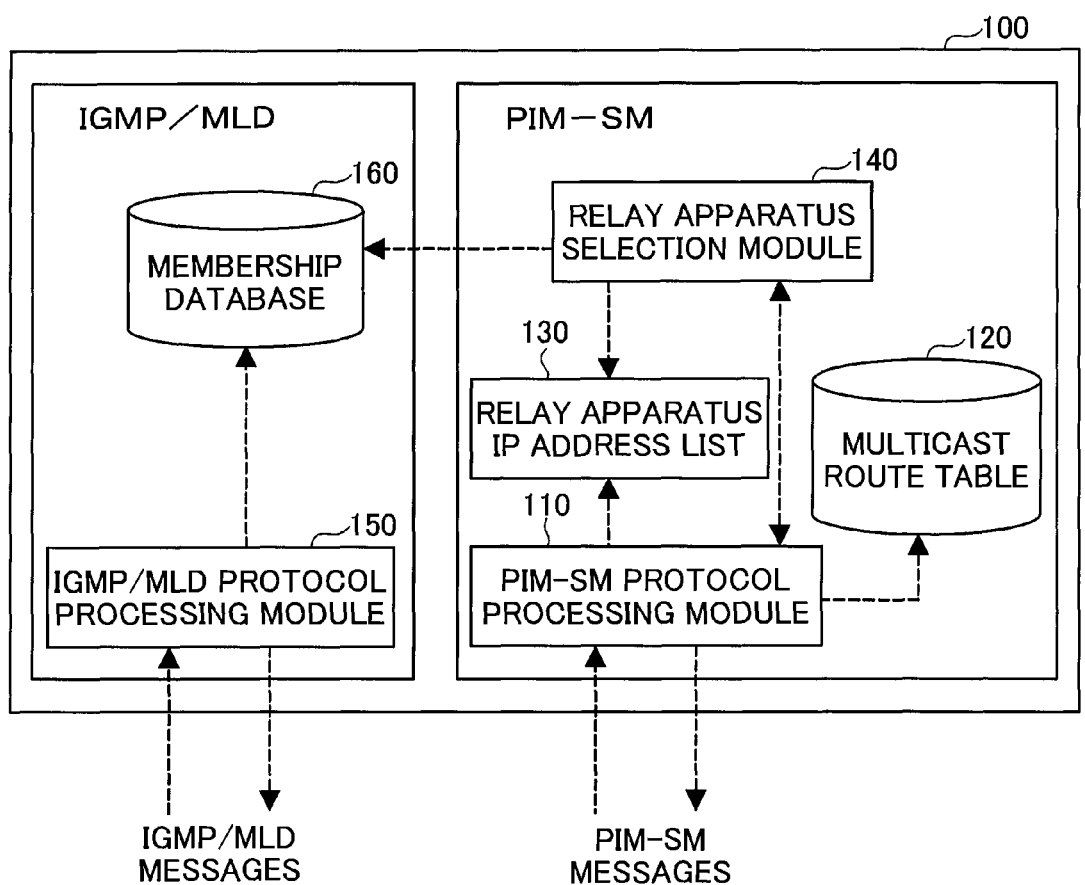
FIG. 2 is an explanatory diagrammatic representation of the general structure of the relay apparatus in the first embodiment.

FIG. 2 is an explanatory diagrammatic representation of the general structure of the relay apparatus 100 in the first embodiment. The relay apparatus 100 has a PIM-SM protocol processing module 110, a multicast route table 120, a relay apparatus IP address list 130, a relay apparatus selection module 140, an IGMP/MLD protocol processing module 150, and a membership database 160.

The PIM-SM protocol processing module 110 functions to process PIM-SM messages. For example, the PIM-SM protocol processing module 110 periodically sends a Hello message (hereafter also be referred to as 'PIM Hello') to another relay apparatus 100 sharing the same segment 300, while performing various processing operations in response to reception of a PIM Hello from another relay apparatus 100. In this embodiment, the PIM-SM protocol processing module 110 obtains IP addresses of all the relay apparatuses 100 (hereafter may be referred to as 'relay apparatus IP address') connecting with the segment 300 from the received PIM Hello and records the obtained IP addresses into the relay apparatus IP address list 130. The relay apparatus IP address list 130 includes relay apparatus IP addresses allocated to all the relay apparatuses 100 connecting with the same segment 300. The PIM-SM protocol processing module 110 also functions to send a Join/Prune message (hereafter also referred to as 'PIM Join/Prune') to an upstream segment connecting with the delivery server 500 among its connecting segments. An upstream relay apparatus accordingly sets and/or deletes a multicast route for delivery of a multicast packet, in order to establish a multicast delivery tree for delivery of a multicast packet to a network and/or prune the established multicast delivery tree.

The PIM-SM protocol processing module 110 also functions to manage the multicast route table 120. The multicast route table 120 stores a multicast route correlated to information (such as a multicast group address and an IP address of a source) used for identifying a multicast packet as a relay object by the relay apparatus 100 and to information on input and output interfaces (I/F). The PIM-SN protocol processing module 110 corresponds to the 'setter' and the 'transmitter' in the claims of the invention.

The relay apparatus selection module 140 functions to perform relay apparatus selection of selecting a designated relay apparatus assigned to multicast packet relay in the network configuration where multiple relay apparatuses 100 are connected to one identical segment. The details of the relay apparatus selection will be described later. The relay apparatus selection module 140 is equivalent to the 'relay apparatus selector' in the claims of the invention.

The IGMP/MLD protocol processing module 150 functions to process IGMP/MLD messages and manage the membership database 160. For example, the IGMP/MLD protocol processing module 150 performs a relevant processing operation, in response to reception of an IPv4 IGMP Membership Report message or ah IPv6 Multicast Listener Report message (hereafter collectively referred to as 'IGMP/MLD Report') from the receiving terminal 200 sharing the same segment 300.

For example, when receiving an IGMP/MLD Report as a join request for a preset multicast group from the receiving terminal 200, the IGMP/MLD protocol processing module 150 obtains multicast group information from the received IGMP/MLD Report and records the obtained multicast group information into the membership database 160. The obtained multicast group information includes, for example, an IP address of the receiving terminal 200 and a multicast group address of the preset multicast group as the target of the join request made by the receiving terminal 200. Multicast group addresses of multicast groups which individual receiving terminals 200 on the same segment belong to are recorded in the membership database 160.

A2. Operations in Reception of Join Request

When receiving an IGMP/MLD Report from each receiving terminal 200, the IGMP/MLD protocol processing module 150 of the relay apparatus 100 obtains the multicast group information from the received IGMP/MLD Report and adds the obtained multicast group information to the membership database 160. The relay apparatus selection module 140 then starts a process of relay apparatus selection described below.

A2-1. Relay Apparatus Selection Process

Figure 3:
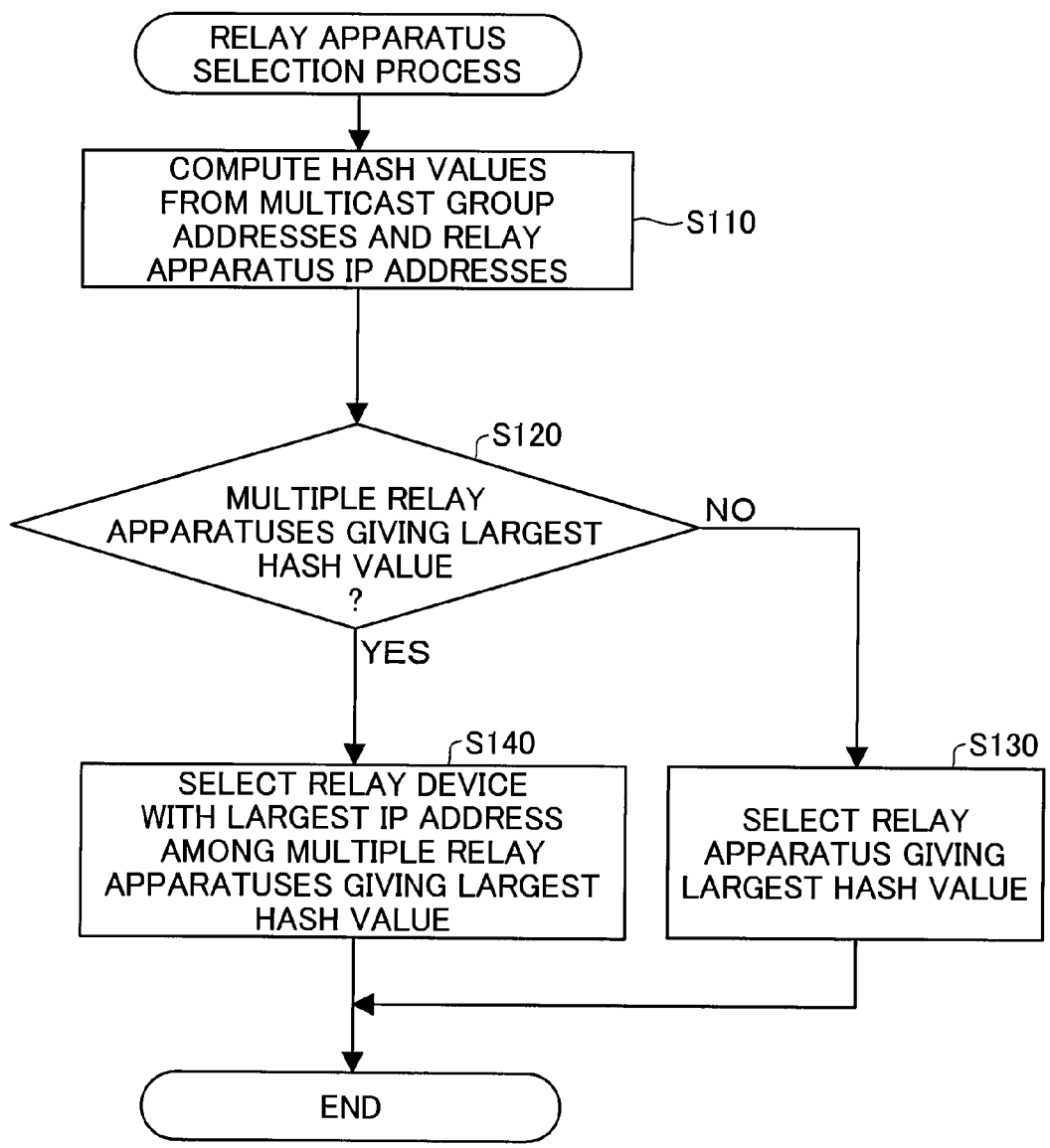
FIG. 3 is a flowchart showing a processing flow of relay apparatus selection performed in the first embodiment.

FIG. 3 is a flowchart showing a processing flow of relay apparatus selection performed in the first embodiment. The relay apparatus selection module 140 computes hash values from the multicast group addresses recorded in the membership database 160 and the relay apparatus IP addresses of all the relay apparatuses 100 connecting with the segment 300 (step S110). More specifically, the relay apparatus selection module 140 uses the relay apparatus IP addresses of all the relay apparatuses 100 recorded in the relay apparatus IP address list 130 after addition of the multicast group information obtained from the IGMP/MLD Report and all the multicast group addresses recorded in the membership database 160 to compute a preset number of hash values, which is specified by the product of the number of the relay apparatus IP addresses and the number of the multicast group addresses:

$$\text{Hash Value} = (1103515245 \times ((1103515245 \times G + 12345) \text{ XOR } C(i)) + 12345) \bmod 2^{31} \quad (1)$$

where G and C(i) respectively represent a multicast group address and a relay apparatus IP address, and XOR denotes exclusive OR (logical add). In the IPv6 protocol, 32-bit values given as results of XOR operations of every 32 bits are used as the multicast group addresses and the relay apparatus IP addresses.

In selection of a designated relay apparatus assigned to relay a certain multicast packet, the relay apparatus selection module 140 selects a relay apparatus 100 with a specific relay apparatus IP address that gives a largest hash value among all the hash values computed from a multicast group address of a multicast group for multicast relay of the certain multicast packet. In the network configuration of this embodiment, the two relay apparatuses 100a and 100b are connected to the segment 300. The designated relay apparatus assigned to relay a certain multicast packet to the receiving terminal 200 is thus selectable by comparison between two hash values computed from a multicast group address of a preset multicast group as the target of the join request made by the receiving terminal 200 and the respective relay apparatus IP addresses.

When the hash values computed from the identical multicast group address include only one largest hash value (step S120: No), the relay apparatus selection module 140 selects a relay apparatus 100 with the relay apparatus IP address giving the largest hash value as a designated relay apparatus (step S130). When the computed hash values include two or more identical largest hash values (step S120: Yes), on the other hand, the relay apparatus selection module 140 selects a relay apparatus 100 with a largest relay apparatus IP address as a designated relay apparatus among the multiple relay apparatuses 100 with the relay apparatus IP addresses giving the identical largest hash values (step S140). The relay apparatus selection process terminates after selection of the designated relay apparatus at either step S130 or step S140.

The relay apparatus selection process is performed individually by each of all the relay apparatuses 100 on the segment 300 that receive the IGMP/MLD Report from the receiving terminal 200. The PIM-SM protocol processing module 110 of the selected relay apparatus 100 as the designated relay apparatus by the relay apparatus selection process sets a multicast route in the multicast route table 120. The multicast route is set to correlate identification for identifying a multicast packet as a relay object (for example, a multicast group address and an IP address of a source) to input and output interfaces of the multicast packet. When receiving a multicast packet, the PIM-SM protocol processing module 110 relays the received multicast packet across the multicast route set in the multicast route table 120. The PIM-SM protocol processing module 110 sends a PIM Join to the upper multicast network 400 after setting the multicast route. This establishes a multicast delivery tree on the network system 1000. The PIM-SM protocol processing module 110 of the non-selected relay apparatus 100 as the designated relay apparatus by the relay apparatus selection process does not have the setting of a multicast route in the multicast route table 120 with regard to a multicast packet of a certain multicast group allocated for multicast deriver to another relay apparatus 100. Even when receiving the multicast packet, the PIM-SM protocol processing module 110 of the non-selected relay apparatus 100 does not relay the received multicast packet.

A3. Operations in Addition of Relay Apparatus

Figure 4:
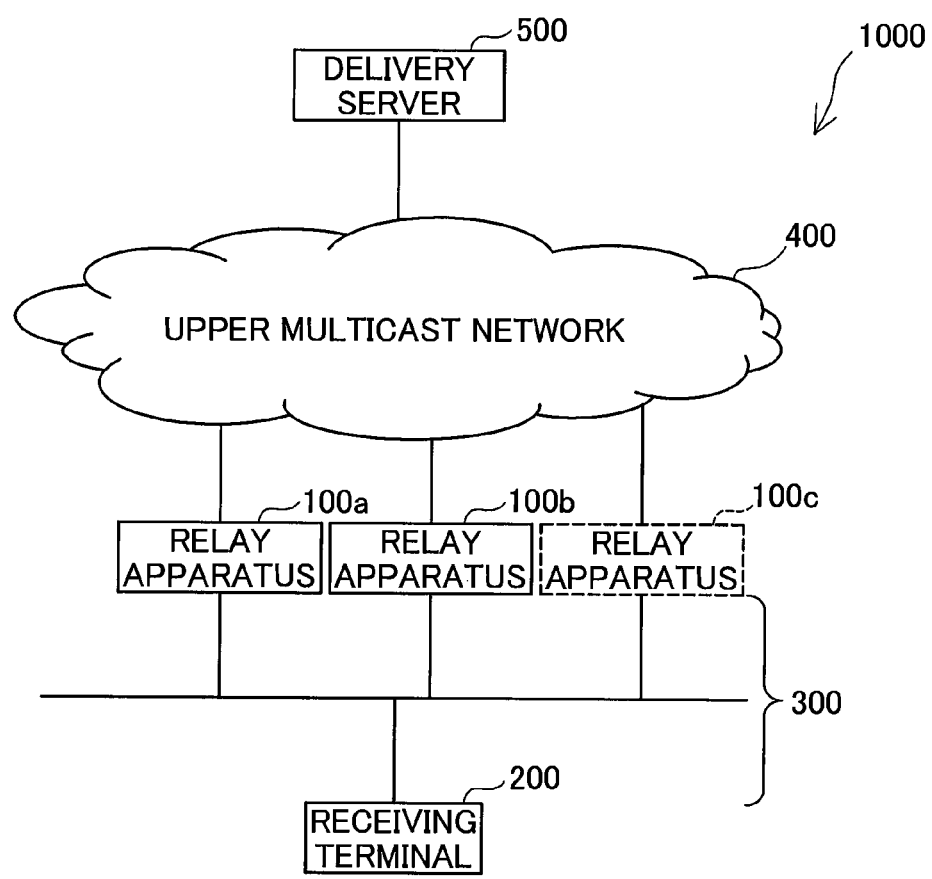
FIG. 4 is an explanatory diagrammatic representation of the general configuration of the network system of the first embodiment after addition of another network relay apparatus.

The relay apparatus selection module 140 performs the relay apparatus selection process when receiving an IGMP/MLD Report from the receiving terminal 200 as described above. The relay apparatus selection module 140 may also perform the relay apparatus selection process on the occasion when another relay apparatus 100 newly joins in the segment 300. FIG. 4 is an explanatory diagrammatic representation of the general configuration of the network system 1000 of the first embodiment after addition of another network relay apparatus 100. When a network relay apparatus 100c is newly connected to the segment 300 as shown in FIG. 4, the PIM-SM protocol processing modules 110 of the relay apparatuses 100a and 100b receive a PIM Hello from the newly joining relay apparatus 100c and records the relay apparatus IP address of the relay apparatus 100c into the respective relay apparatus IP address lists 130.

The PIM-SM protocol processing module 110 of the newly joining relay apparatus 100c receives PIM Hellos from the relay apparatuses 100a and 100b and records the relay apparatus IP addresses of the relay apparatuses 100a and 100b into the relay apparatus IP address list 130. The IGMP/MLD protocol processing module 150 of the relay apparatus 100c sends a General Query to the segment 300 and receives an IGMP/MLD Report as a response to the Genera Query from the receiving terminal 200. The IMGP/MLD protocol processing module 150 subsequently obtains multicast group information from the received IGMP/MLD Report and records the obtained multicast group information into the membership database 160. The obtained multicast group information includes a multicast group address of a certain multicast group which the receiving terminal 200 belongs to and an IP address of a source for delivery of a multicast packet.

The relay apparatus selection modules 140 of the relay apparatuses 100a, 100b, and 100c individually perform the relay apparatus selection process. More specifically, each of the relay apparatus selection modules 140 computes hash values from all the multicast group addresses recorded in the membership database 160 and all the relay apparatus IP addresses recorded in the relay apparatus IP address list 130 after addition of the relay apparatus IP address of the relay apparatus 100c and selects again a designated relay apparatus assigned to relay a multicast packet with regard to each of the multicast group addresses recorded in the membership database 160. The PIM-SM protocol processing module 110 of the selected relay apparatus 100 as the designated relay apparatus sets a multicast route in the multicast rout table 120 and sends a PIM join to the upper multicast network 400. This establishes a new multicast delivery tree on the network system 1000.

The relay apparatus 100a or 100b was previously selected as the designated relay apparatus assigned to relay a certain multicast packet to the receiving terminal 200 and is no longer the designated relay apparatus after addition of the relay apparatus 100c to the segment 300. The PIM-SM protocol processing module 110 of the former designated relay apparatus 100a or 100b deletes a multicast route set in advance for relaying the certain multicast packet to the receiving terminal 200 among the multicast routes set in the multicast route table 120 and sends a PIM Prune to the upper multicast network 400 to be withdrawn from the multicast delivery tree.

A4. Operations in Stop of Relay Apparatus

When some of the relay apparatuses 100 connecting with the segment 300 goes down due to some cause, such as failure or trouble, another relay apparatus 100 performs the following series of operations. The relay apparatus selection module 140 may perform the relay apparatus selection process on the occasion when some of the relay apparatuses 100 connecting with the segment 300 goes down due to some cause, such as a failure or trouble, as well as on the occasion when another relay apparatus 100 newly joins in the segment 300. It is assumed that one relay apparatus 100c goes down in the network configuration of FIG. 4 where the three relay apparatuses 100a, 100b, and 100c are connected to the segment 300. The PIM-SM protocol processing modules 110 of the other relay apparatuses 100a and 100b identify a stop of the relay apparatus 100c based on the query timeout due to failed reception of a PIM Hello from the relay apparatus 100c within a preset period and delete the relay apparatus IP address of the relay apparatus 100c from the relay apparatus IP address lists 130.

The relay apparatus selection modules 140 of the relay apparatuses 100a and 100b individually perform the relay apparatus selection process. More specifically, each of the relay apparatus selection modules 140 computes hash values from all the multicast group addresses recorded in the membership database 160 and all the relay apparatus IP addresses recorded in the relay apparatus IP address list 130 after deletion of the relay apparatus IP address of the relay apparatus 100c and selects again a designated relay apparatus assigned to relay a multicast packet with regard to each of the multicast group addresses recorded in the membership database 160. The PIM-SM protocol processing module 110 of the selected relay apparatus 100 as the designated relay apparatus sets a multicast route in the multicast rout table 120 and sends a PIM join to the upper multicast network 400. This establishes a new multicast delivery tree on the network system 1000.

In the network configuration of the first embodiment discussed above, the relay apparatus selection module 140 of the relay apparatus 100 unequivocally selects a designated relay apparatus assigned to relay a multicast packet to the receiving terminal 200 among the multiple relay apparatuses 100 connecting with one identical segment. This arrangement assures distribution of the processing load applied by the relay of multicast packets into the respective relay apparatuses 100. In the network configuration of this embodiment, among the multiple relay apparatuses 100 connected in parallel to one identical segment, a different relay apparatus 100 may be specified as the designated relay apparatus assigned to relay a multicast packet with regard to each multicast group. This arrangement effectively prevents the concentration of the processing load applied by the relay of multicast packets onto one single relay apparatus 100.

Figure 5:
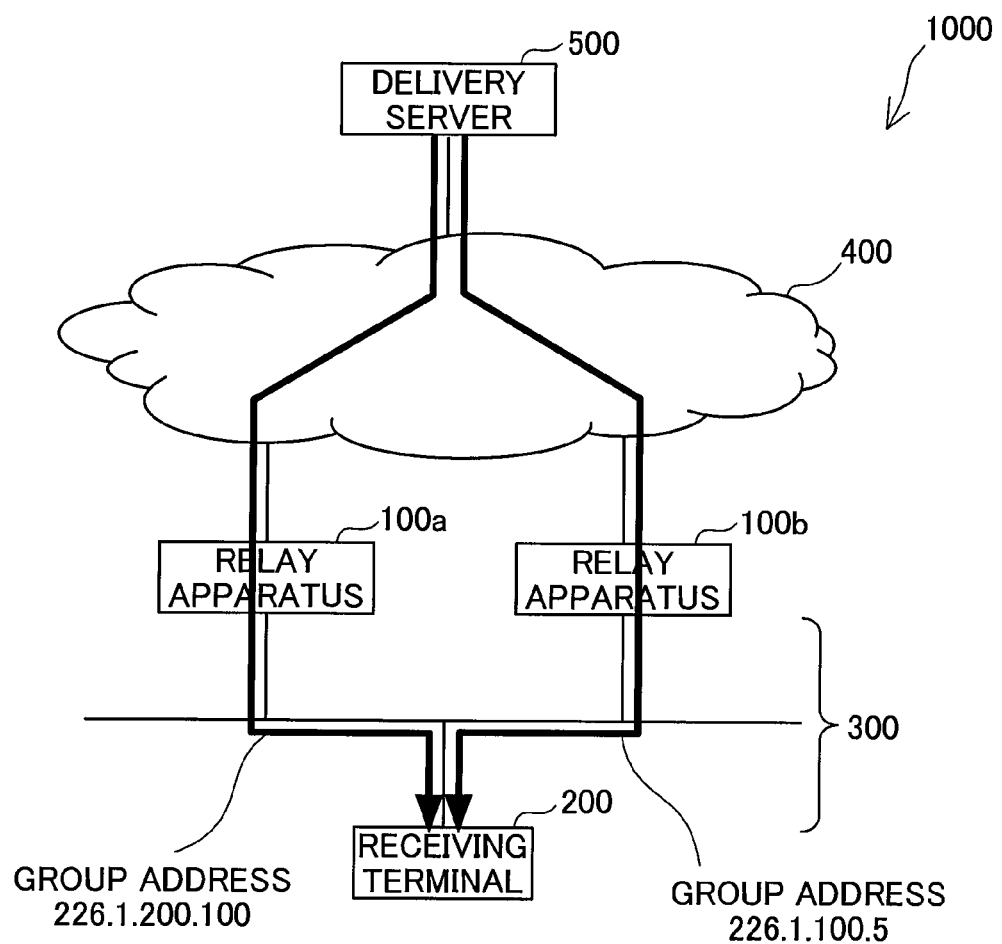
FIG. 5 is an explanatory diagrammatic representation of relay of multicast packets in the embodiment of the invention.

This advantageous characteristic is described more with reference to a concrete example. FIG. 5 is an explanatory diagrammatic representation of relay of multicast packets in the embodiment of the invention. The designated relay apparatus assigned to relay a multicast packet is selected with regard to each multicast group address, based on values unequivocally determined from the multicast group addresses and the relay apparatus IP addresses. The different relay apparatus 100 can thus be selected as the designated relay apparatus assigned to relay a multicast packet with regard to each multicast group. In the illustrated example of FIG. 5, a designated relay apparatus assigned to relay a multicast packet is selected with regard to each of two multicast groups having different multicast group addresses of 226.1.200.100 and 226.1.100.5. The respective relay apparatus selection modules 140 of the two relay apparatuses 100a and 100b individually perform the relay apparatus selection process to select an identical relay apparatus as the designated relay apparatus with regard to each of the two multicast groups having the different multicast group addresses. For example, the relay apparatus 100a is selected as the designated relay apparatus assigned to relay a multicast packet to the multicast group having the multicast group address of 226.1.200.100, whereas the relay apparatus 100b is selected as the designated relay apparatus assigned to relay a multicast packet to the multicast group having the multicast group address of 226.1.100.5. The multiple relay apparatuses 100 can thus share the relay of multicast packets.

The relay apparatus 100 of the first embodiment computes the hash values according to Equation (1) given above for selection of the designated relay apparatus assigned to relay a multicast packet. Such computation desirably reduces the selection load in the relay apparatus 100. The combination of a fixed multicast group address with a fixed relay apparatus IP address gives a fixed hash value as the computation result. This prevents the designated relay apparatus assigned to multicast relay with regard to one multicast group from being changed on every time of the relay apparatus selection. On the assumption that the relay apparatus 100c goes down in the network configuration of FIG. 4, the relay apparatus selection process performed again to reselect the designated relay apparatus for multicast packet relay in a certain multicast group, which the relay apparatus 100a was previously assigned to, gives the same result of selecting the relay apparatus 100a as the designated relay apparatus. Namely the assignments of the relay apparatuses 100a and 100b as the designated relay apparatuses for multicast packet relay in different multicast groups prior to the stop of the relay apparatus 100c are not exchanged by the relay apparatus selection process. Only in the case where the relay apparatus 100a or the relay apparatus 100b takes over the assignment as the designated relay apparatus for multicast packet relay in a certain multicast group, which the relay apparatus 100c was previously assigned to, the PIM-SM protocol processing module 110 of the relay apparatus 100a or 100b as the newly assigned designated relay apparatus is required to set a multicast route for multicast packet relay in the certain multicast group into the multicast route table 120.

When the relay apparatus selection process selects a designated relay apparatus by a method other than computation of the hash values according to Equation (1), the assignment as the designated relay apparatus for multicast packet relay in a multicast group, which a relay apparatus other than the inactivated relay apparatus was previously assigned to, may be changed. Changing the designated relay apparatus requires the relay apparatus assigned as the former designated relay apparatus to perform the series of processing of sending a PIM Prune to the upper multicast network, leaving the relay apparatus from the established multicast delivery tree, and deleting the corresponding multicast route from the multicast route table. This undesirably increases the processing load in the relay apparatus and may interfere with multicast packet relay during the series of processing.

In the network configuration of the first embodiment, the relay apparatus selection modules 140 of the respective relay apparatuses 100 perform the relay apparatus selection process of selecting a designated relay apparatus assigned to multicast packet relay in each multicast group. The respective relay apparatuses 100 are thus not required to mutually send notice of the selection results. This arrangement desirably shortens the period between selection of a designated relay apparatus and a start of actual multicast packet relay and reduces the traffic on the network.

In the network configuration of the first embodiment, when a relay apparatus 100 newly joins in the segment 300, the relay apparatus selection module 140 selects the designated relay apparatus assigned to relay a certain multicast packet to the receiving terminal 200 among the multiple relay apparatuses 100 on the same segment 300 including the newly joining relay apparatus 100. The multiple relay apparatuses 100 on the same segment 300 including the newly joining relay apparatus 100 can thus share the relay of multicast packets. This arrangement assures distribution of the processing load applied by the relay of multicast packets into the respective relay apparatuses 100.

In the network configuration of the first embodiment, when some of the relay apparatuses 100 connecting with the segment goes down due to some cause, such as a failure or trouble, the relay apparatus selection module 140 selects the designated relay apparatus assigned to relay a certain multicast packet to the receiving terminal 200 among the multiple relay apparatuses 100 on the same segment excluding the inactivated relay apparatus 100. The multiple relay apparatuses 100 on the same segment 300 excluding the inactivated relay apparatus 100 can thus share the relay of multicast packets. This arrangement assures distribution of the processing load applied by the relay of multicast packets into the respective relay apparatuses.

B. Second Embodiment

B1. Structure of Network Relay Apparatus

Figure 6:
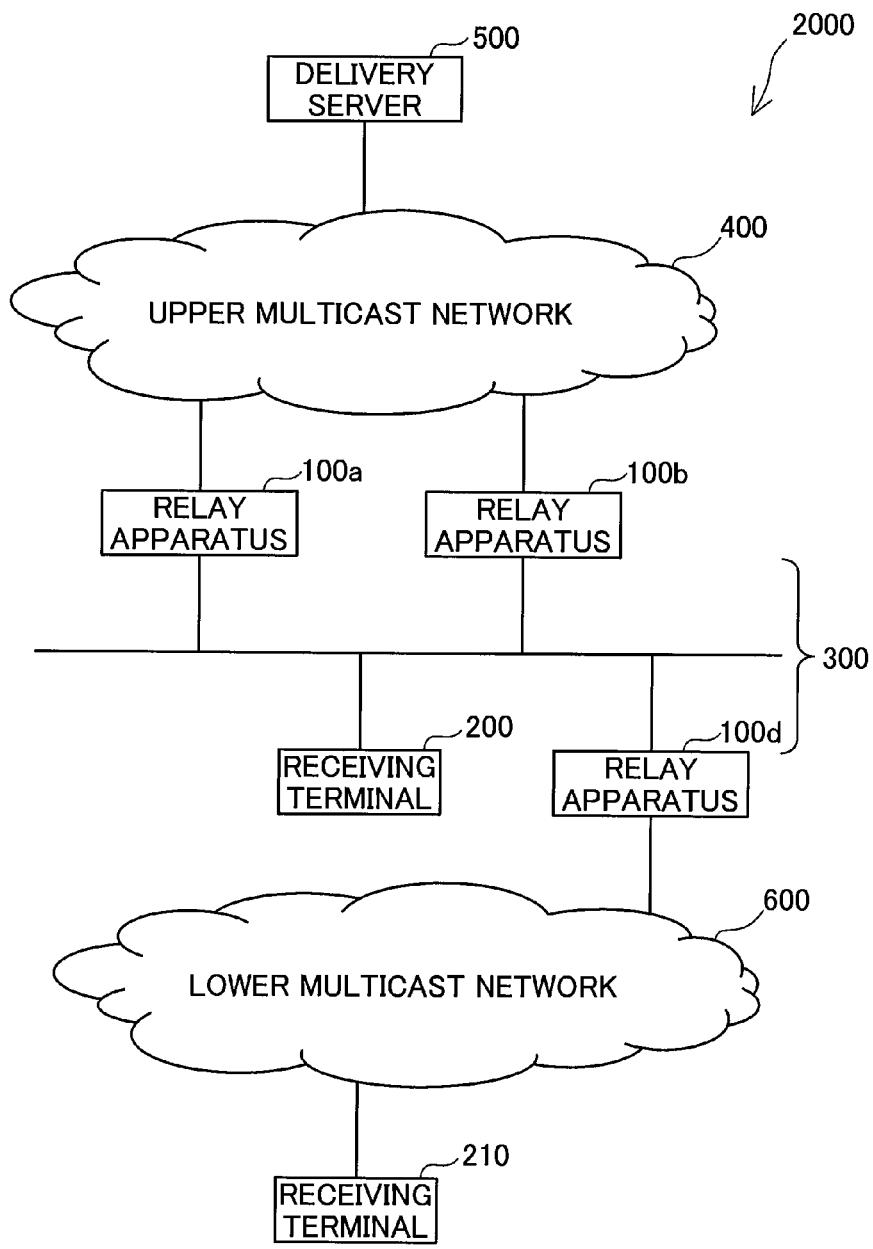
FIG. 6 is an explanatory diagrammatic representation of the general configuration of a network system including network relay apparatuses according to a second embodiment of the invention.

FIG. 6 is an explanatory diagrammatic representation of the general configuration of a network system 2000 including network relay apparatuses according to a second embodiment of the invention. The first embodiment describes the relay apparatus 100 that is connected with the upper multicast network 400. The second embodiment describes the relay apparatus 100 that is not connected with the upper multicast network 400. The similar components and functional modules of the second embodiment to those of the first embodiment are expressed by the same numerals and symbols, and are thus not specifically explained here. The general structure of the relay apparatus 100 in the second embodiment is identical with that of the relay apparatus 100 in the first embodiment and is thus not specifically described here.

As shown in FIG. 6, the network system 2000 of the second embodiment has three relay apparatuses 100a, 100b, and 100d, a receiving terminal 200, an upper multicast network 400, a delivery server 500, and a lower multicast network 600. The three relay apparatuses 100a, 100b, and 100d are connected to one identical segment 300. The relay apparatuses 100a and 100b are respectively connected to the upper multicast network 400, which connects with the delivery server 500, by means of segments different from the segment 300. The relay apparatus 100d is connected to the lower multicast network 600 by means of a segment different from the segment 300. A receiving terminal 210 is connected to the lower multicast network 600.

B2. Operations in Reception of Join Request

Series of operations performed in response to transmission of a join request from the receiving terminal 210 are described first. The relay apparatus 100d may receive an IGMP/MLD Report from the receiving terminal 210 via the lower multicast network 600. In a modified network configuration with at least one intermediate relay apparatus (not shown) located between the receiving terminal 210 and the relay apparatus 100d, the relay apparatus 100d may receive a PIM join from the intermediate relay apparatus (not shown) in response to transmission of an IGMP/MLD Report from the receiving terminal 210. In either of these cases, the PIM-SM protocol processing module 110 of the relay apparatus 100d sets a multicast route for relaying a certain multicast packet to the receiving terminal 210 in the multicast route table 120. The IGMP/MLD protocol processing module 150 adds multicast group information, which includes a multicast group address of a preset multicast group as the target of the join request made by the receiving terminal 210 and an IP address of a source, to the membership database 160. The relay apparatus selection module 140 of the relay apparatus 100d then starts a relay apparatus selection process.

The relay apparatus selection module 140 of the relay apparatus 100d performs the relay apparatus selection process with the relay apparatus IP addresses of all the relay apparatuses 100 other than the relay apparatus 100d recorded in the relay apparatus IP address list 130 and a multicast group address of a preset multicast group as the target of the join request made by the receiving terminal 210, in order to select a designated relay apparatus assigned to relay a multicast packet to the receiving terminal 210. The PIM-SM protocol processing module 110 of the relay apparatus 100d sends a PIM Join including the selection result to the upstream segment 300. The PIM-SM protocol processing module 110 of either the relay apparatus 100a or the relay apparatus 100b sets a multicast route in the multicast route table 120, based on the selection result by the relay apparatus 100d. More specifically, the PIM-SM protocol processing module 110 of only either the relay apparatus 100a or the relay apparatus 100b selected as the designated relay apparatus by the relay apparatus selection module 140 of the relay apparatus 100d sets a multicast route for relaying a certain multicast packet to the receiving terminal 210 in the multicast route table 120.

Series of operations performed in response to transmission of a join request from the receiving terminal 200 are described below. When each of the relay apparatuses 100a, 100b, and 100d receives an IGMP/MLD Report from the receiving terminal 200, the IGMP/MLD protocol processing module 150 adds the multicast group information to the membership database 160 and the relay apparatus selection module 140 starts the relay apparatus selection process in the same manner as the first embodiment.

When either the relay apparatus 100a or the relay apparatus 100b is selected as the designated relay apparatus assigned to relay a multicast packet by the relay apparatus selection process, the same series of operations as those of the first embodiment are performed and are thus not specifically explained here. When the relay apparatus 100d is selected as the designated relay apparatus assigned to relay a multicast packet, on the other hand, the relay apparatus selection module 140 of the relay apparatus 100d performs the relay apparatus selection process with a multicast group address of a preset multicast group allocated for multicast relay to the own relay apparatus 100d and relay apparatus IP addresses of different relay apparatuses 100 other than the own relay apparatus IP address recorded in the relay apparatus IP address list 130. The PIM-SM protocol processing module 110 of the relay apparatus 100d sends a PIM Join including the selection result to the segment 300. The PIM-SM protocol processing module 110 in each of the relay apparatuses 100a and 100b sets a multicast route in the multicast route table 120, based on the selection result by the relay apparatus 100d.

B3. Operations in Addition of Relay Apparatus

Figure 7:
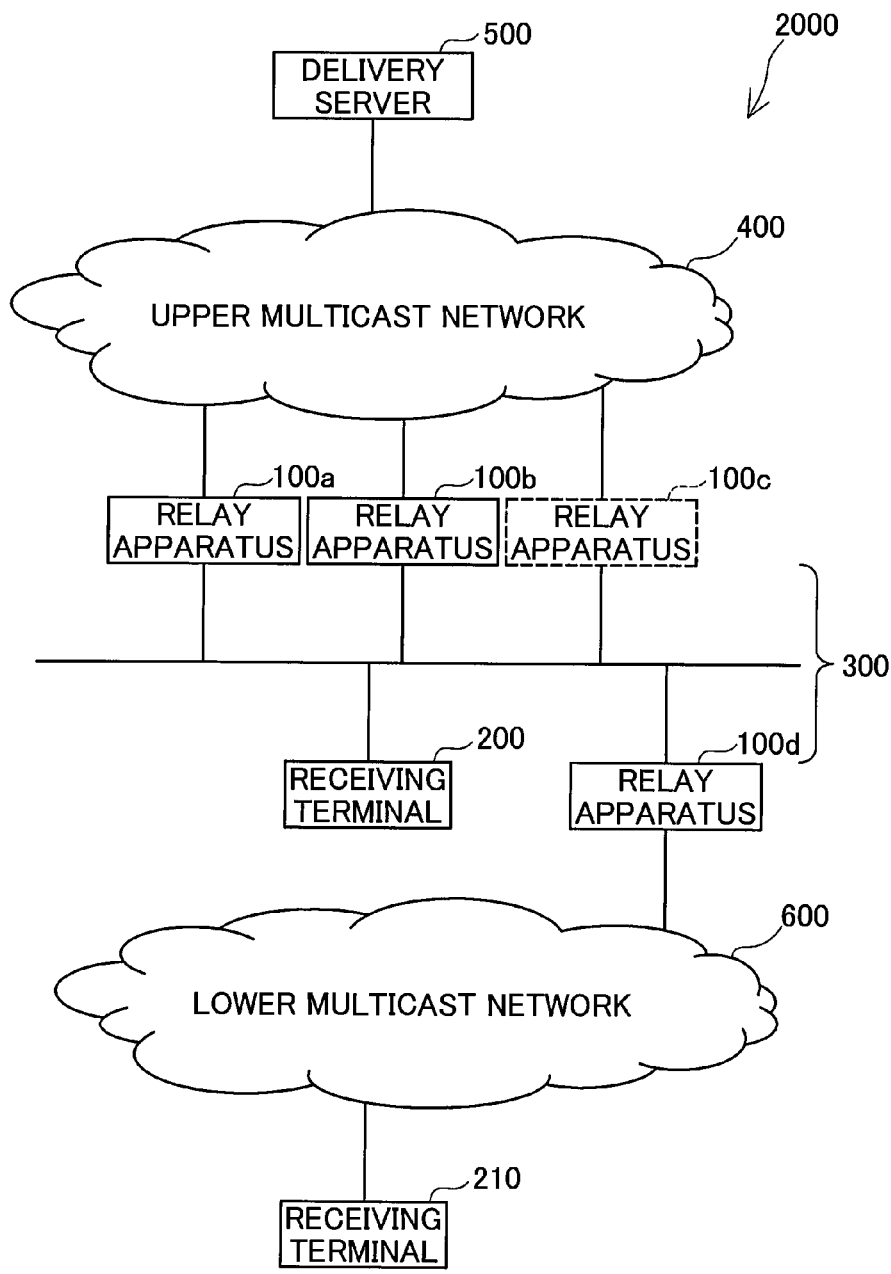
FIG. 7 is an explanatory diagrammatic representation of the general configuration of the network system of the second embodiment after addition of another network relay apparatus.

Like the first embodiment, the relay apparatus selection module 140 of the second embodiment may also perform the relay apparatus selection process on the occasion when another relay apparatus 100 newly joins in the segment 300. FIG. 7 is an explanatory diagrammatic representation of the general configuration of the network system 2000 of the second embodiment after addition of another network relay apparatus 100. When a relay apparatus 100c is newly connected to the segment 300 as shown in FIG. 7, the respective PIM-SM protocol processing modules 110 of the relay apparatuses 100a, 100b, 100c, and 100d record the mutual relay apparatus IP addresses in the respective relay apparatus IP address lists 130 in the same manner as the first embodiment. The IGMP/MLD protocol processing module 150 of the relay apparatus 100c records the multicast group information with regard to the receiving terminal 200 into the membership database 160.

The relay apparatus selection modules 140 of the relay apparatuses 100a, 100b, 100c, and 100d individually perform the relay apparatus selection process. More specifically, each of the relay apparatus selection modules 140 selects again a designated relay apparatus assigned to relay a multicast packet with regard to each multicast group address, based on all the multicast group addresses recorded in the membership database 160 and all the relay apparatus IP addresses recorded in the relay apparatus IP address list 130 after addition of the relay apparatus IP address of the relay apparatus 100c.

The relay apparatus selection module 140 of the relay apparatus 100d performs the relay apparatus selection process with a multicast group address of a certain multicast packet to be relayed from the segment 300 to the lower multicast network 600 by the relay apparatus 100d and the relay apparatus IP addresses of the different relay apparatuses 100 other than the own relay apparatus IP address recorded in the relay apparatus IP address list 130 after addition of the relay apparatus IP address of the relay apparatus 100c. The PIM-SM protocol processing module 110 of the relay apparatus 100d sends a PIM Join including the selection result to the segment 300. The PIM-SM protocol processing module 110 in each of the relay apparatuses 100a, 100b, and 100c sets a multicast route in the multicast route table 120, based on the selection result by the relay apparatus 100d.

B4. Operations in Stop of Relay Apparatus

Like the first embodiment, the relay apparatus selection module 140 of the second embodiment may also perform the relay apparatus selection process on the occasion when some of the relay apparatuses 100 connecting with the segment 300 goes down due to some cause, such as a failure or trouble. It is assumed that one relay apparatus 100c goes down in the network configuration of FIG. 7 where the four relay apparatuses 100a, 100b, 100c, and 100d are connected to the segment 300. The PIM-SM protocol processing modules 110 of the relay apparatuses 100a, 100b, and 100d delete the relay apparatus IP address of the relay apparatus 100c from the relay apparatus IP address lists 130 in the same manner as the first embodiment.

The relay apparatus selection modules 140 of the relay apparatuses 100a, 100b, and 100d individually perform the relay apparatus selection process. More specifically, each of the relay apparatus selection modules 140 selects again a designated relay apparatus assigned to relay a multicast packet with regard to each multicast group address, based on all the multicast group addresses recorded in the membership database 160 and all the relay apparatus IP addresses recorded in the relay apparatus IP address list 130 after deletion of the relay apparatus IP address of the relay apparatus 100c.

The relay apparatus selection module 140 of the relay apparatus 100d performs the relay apparatus selection process with a multicast group address of a certain multicast packet to be relayed from the segment 300 to the lower multicast network 600 by the relay apparatus 100d and the relay apparatus IP addresses of the different relay apparatuses 100 other than the own relay apparatus IP address recorded in the relay apparatus IP address list 130 after deletion of the relay apparatus IP address of the relay apparatus 100c. The PIM-SM protocol processing module 110 of the relay apparatus 100d sends a PIM Join including the selection result to the segment 300. The PIM-SM protocol processing module 110 in each of the relay apparatuses 100a and 100b sets a multicast route in the multicast route table 120, based on the selection result by the relay apparatus 100d.

In the network configuration of the second embodiment discussed above, the relay apparatus selection module 140 selects a designated relay apparatus assigned to relay a multicast packet to the receiving terminal 210 connecting with the downstream network among the other relay apparatuses 100 connecting with the upstream segment. This arrangement assures distribution of the processing load applied by the relay of multicast packets into the respective relay apparatuses 100. The multiple relay apparatuses 100 can share the relay of multicast packets to the receiving terminal 200 connecting with one identical segment, as well as the relay of multicast packets to the receiving terminal 210 connecting with a different segment. This arrangement effectively prevents the concentration of the processing load applied by the relay of multicast packets onto one single relay apparatus 100.

C. Third Embodiment

C1. Structure of Network Relay Apparatus

Each relay apparatus of the first embodiment does not mutually keep information, such as a source address and a multicast group address of a multicast group allocated for multicast relay to another relay apparatus on the same segment. Each relay apparatus of a third embodiment according to the invention, on the other hand, mutually keeps the information, such as the source address and the multicast group address of the multicast group allocated for multicast relay to another relay apparatus. The general configuration of a network system including such relay apparatuses according to the third embodiment is similar to that of the first embodiment or the second embodiment and is thus not specifically explained here.

Figures 8, 9:
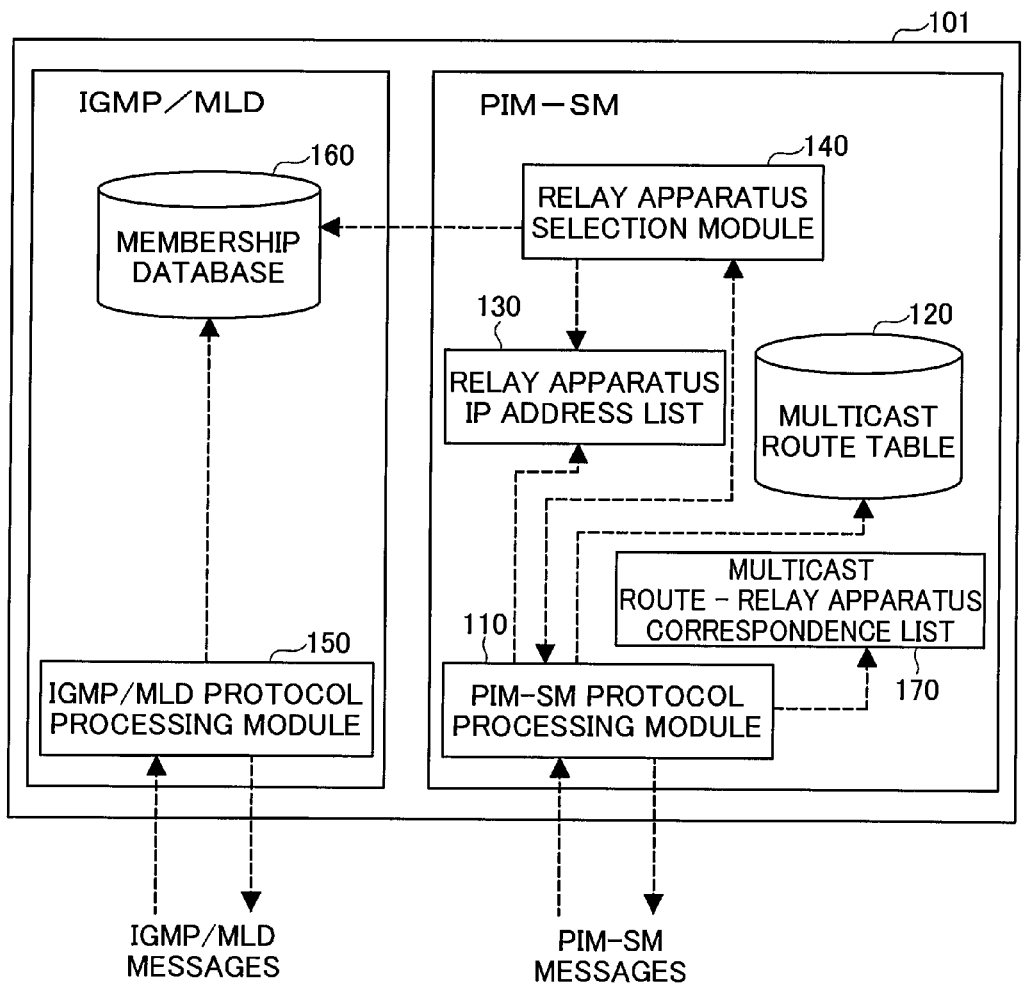
FIG. 8 is an explanatory diagrammatic representation of the general structure of a relay apparatus according to the third embodiment.
FIG. 9 is an explanatory diagrammatic representation of a multicast route-relay apparatus correspondence list.

FIG. 8 is an explanatory diagrammatic representation of the general structure of a relay apparatus 101 according to the third embodiment. FIG. 9 is an explanatory diagrammatic representation of a multicast route-relay apparatus correspondence list 170. The relay apparatus 101 of the third embodiment has the multicast route-relay apparatus correspondence list 170 (hereafter may be simplified as 'correspondence list'), in addition to the components of the relay apparatus 100 of the first embodiment. The correspondence list 170 is stored in a storage unit, such as a memory (not shown). The memory storing the correspondence list 170 is equivalent to the 'first storage' in the claims of the invention. As shown in FIG. 9, the correspondence list 170 is set to correlate a multicast group address and a source address used as information for identifying a multicast packet with a set multicast route to a relay apparatus IP address of a relay apparatus 110 selected as a designated relay apparatus assigned to multicast relay across the multicast route as shown in FIG. 9. The operations performed by the relay apparatuses 101 are described below, with omission of explanation about the operations identical with those of the first embodiment. The following description refers to FIGS. 1, 4, and 6 with replacement of the relay apparatuses 100 by the relay apparatuses 101.

C2. Operations in Reception of Join Request

Series of operations performed by the relay apparatuses 101 in the network configuration of FIG. 1 are described first. When the relay apparatus 101 receives an IGMP/MLD Report from the receiving terminal 200, the PIM-SM protocol processing module 110 of the relay apparatus 101 obtains information for identifying a multicast packet, such as a multicast group address and a source address, from the received IGMP/MLD Report and searches the correspondence list 170 for any entry matching with the obtained information. Only when a search result of no entry matching with the obtained information in the correspondence list 170 is given by the PIM-SM protocol processing module 110, the relay apparatus selection module 140 starts the relay apparatus selection process. After selection of a designated relay apparatus 101 assigned to multicast relay across a set multicast route by the relay apparatus selection process, the PIM-SM protocol processing module 110 adds a new entry including a relay apparatus IP address of the selected relay apparatus 101 and the multicast route to the correspondence list 170. When the correspondence list 170 has any entry matching with the information for identifying a multicast packet with a set multicast route obtained from the received IGMP/MLD Report, the PIM-SM protocol processing module 110 specifies a relay apparatus 101 having a specific relay apparatus IP address correlated to the matching entry as a designated relay apparatus assigned to multicast relay across the multicast route.

Series of operations performed by the relay apparatuses 101 in the network configuration of FIG. 6 are described below. When a relay apparatus 101d receives an IGMP/MLD Report from the receiving terminal 210 or receives a PIM Join sent from an intermediate relay apparatus (not shown) in response to reception of an IGMP/MLD Report from the receiving terminal 210, the PIM-SM protocol processing module 110 of the relay apparatus 101d obtains information for identifying a multicast packet, such as a multicast group address and a source address, from the received IGMP/MLD Report or the received IPM Join and searches the correspondence list 170 for any entry matching with the obtained information. Only when a search result of no entry matching with the obtained information in the correspondence list 170 is given by the PIM-SM protocol processing module 110, the relay apparatus selection module 140 starts the relay apparatus selection process. After selection of a designated relay apparatus 101 assigned to multicast relay across a set multicast route by the relay apparatus selection process, the PIM-SM protocol processing module 110 of the relay apparatus 101d adds a new entry including a relay apparatus IP address of the selected relay apparatus 101 and the multicast route to the correspondence list 170. The PIM-SM protocol processing module 110 of the relay apparatus 101d subsequently sends a PIM Join including the selection result to the upstream segment 300. The PIM-SM protocol processing modules 110 of upstream relay apparatuses 101a and 101b receive the PIM Join from the relay apparatus 101d and update the information stored in the own correspondence lists 170 to the received information including the relay apparatus IP address of the selected relay apparatus 101 and the multicast route. The PIM-SM protocol processing module 110 of this embodiment is equivalent to the 'updater' in the claims of the invention. When the correspondence list 170 has any entry matching with the information for identifying a multicast packet with a set multicast route obtained from the received IGMP/MLD Report, the PIM-SM protocol processing module 110 of the relay apparatus 101d sends a PIM Join including specification of a relay apparatus 101 having a specific relay apparatus IP address correlated to the matching entry as a designated relay apparatus assigned to multicast relay across the multicast route.

C3. Operations in Addition of Relay Apparatus

Series of operations performed by the relay apparatuses 101 in the network configuration of FIG. 4 are described below. When a relay apparatus 101c is newly connected to the segment 300 as shown in FIG. 4, the PIM-SM protocol processing module 110 of either the relay apparatus 101a or the relay apparatus 101b sends a PIM Hello including the information stored in the correspondence list 170 to the relay apparatus 101c. One relay apparatus 101 specified as a DR (Designated Router) may collectively perform transmission of the individual correspondence lists 170 of the respective relay apparatuses 101. Alternatively each relay apparatus 101 may send the own correspondence list 170 including only the record of each assigned multicast route. The correspondence list 170 may be sent accompanied with any message other than the PIM Hello. Series of operations performed by the respective relay apparatuses 101 in this situation in the network configuration of FIG. 7 are similar to those in the network configuration of FIG. 4 and are thus not specifically explained here.

C4. Operations in Stop of Relay Apparatus

It is assumed that one relay apparatus 101c goes down in the network configuration of FIG. 4 where the three relay apparatuses 101a, 101b, and 101c are connected to the segment 300. The PIM-SM protocol processing modules 110 of the relay apparatuses 101a and 101b retrieves each multicast route assigned to the relay apparatus 101c from the correspondence list 170. The relay apparatus selection module 140 performs the relay apparatus selection process only with regard to each multicast route assigned to the relay apparatus 101c, based on the result of retrieval performed by the PIM-SM protocol processing module 110. Series of operations performed by the respective relay apparatuses 101 in this situation in the network configuration of FIG. 7 are similar to those in the network configuration of FIG. 4 and are thus not specifically explained here.

In the network configuration of the third embodiment discussed above, the relay apparatus selection module 140 performs the relay apparatus selection process to select a relay apparatus 101 as a designated relay apparatus assigned to relay a certain multicast packet, only when the correspondence list 170 does not have any entry of correlating the certain multicast packet to a relay apparatus. This arrangement effectively reduces the selection load in the relay apparatus 101. Each relay apparatus 101 of the third embodiment keeps information on the respective multicast routes assigned to the other relay apparatuses 101 on the same segment. This arrangement does not require the relay apparatus selection process for selection a designated relay apparatus assigned to multicast relay with regard to each of the multicast groups recorded in the membership database 160, thus desirably reducing the processing load of the relay apparatus selection process.

D. Fourth Embodiment

D1. Structure of Network Relay Apparatus

The first embodiment describes the relay apparatus that performs the relay apparatus selection process by computation of the hash values. A fourth embodiment according to the invention describes a relay apparatus that performs a relay apparatus selection process by another technique. The general configuration of a network system including such relay apparatuses according to the third embodiment is similar to that of the first embodiment or the second embodiment and is thus not specifically explained here.

Figures 10, 11:
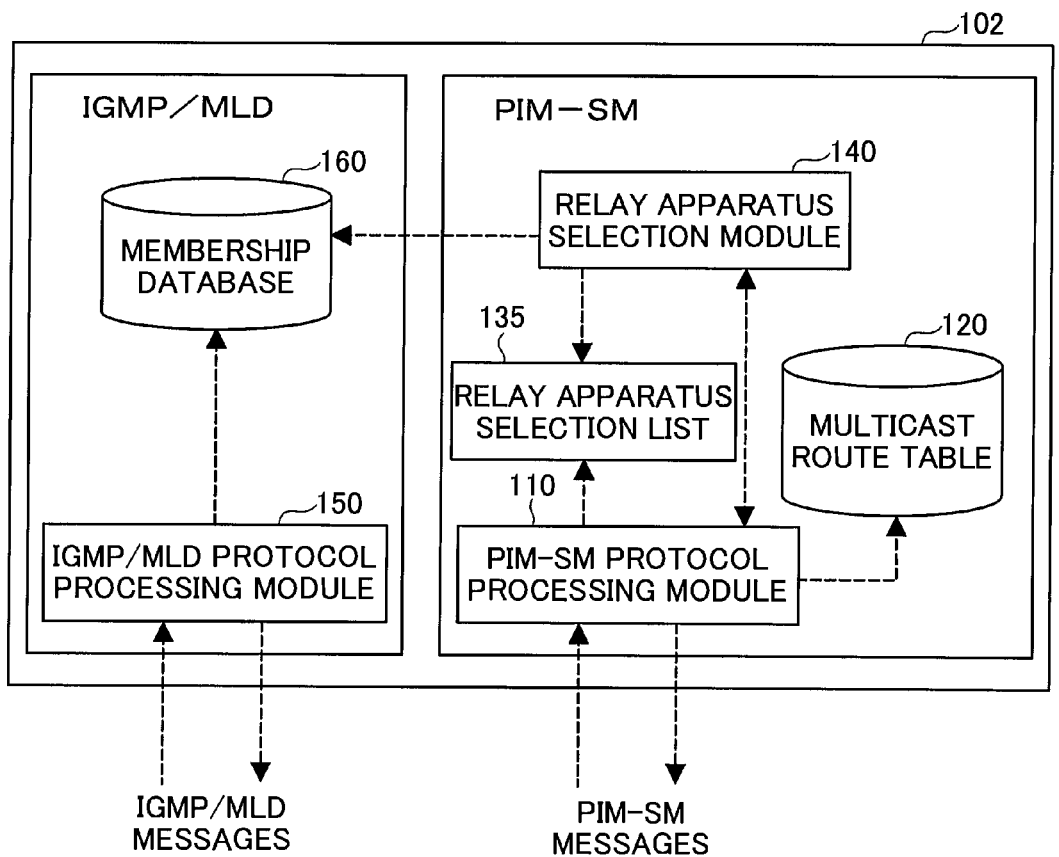
FIG. 10 is an explanatory diagrammatic representation of the general structure of a relay apparatus according to the fourth embodiment.
FIG. 11 is an explanatory diagrammatic representation of a relay apparatus selection list.

FIG. 10 is an explanatory diagrammatic representation of the general structure of a relay apparatus 102 according to the fourth embodiment. FIG. 11 is an explanatory diagrammatic representation of a relay apparatus selection list 135. The relay apparatus 102 of the fourth embodiment has the relay apparatus selection list 135 (hereafter may be simplified as 'selection list'), in addition to the components of the relay apparatus 100 of the first embodiment with omission of the relay apparatus IP address list 130. The selection list 135 is stored in a storage unit, such as a memory (not shown). The memory storing the selection list 135 is equivalent to the 'second storage' in the claims of the invention. As shown in FIG. 11, the selection list 135 is set to correlate information for identifying each multicast packet to a relay apparatus IP address of a relay apparatus 102 specified as a designated relay apparatus assigned to relay the multicast packet. In the relay apparatus selection list 135 shown in FIG. 11, each entry has a relay apparatus IP address of each relay apparatus, group prefix information including a multicast group address of a multicast group allocated for multicast relay to the relay apparatus and a prefix length thereof representing an address range, and a priority. The priority is used to preferentially specify one relay apparatus as a designated relay apparatus among two or more relay apparatuses correlated to one identical multicast group address in the group prefix information. The selection list 135 is not restricted to the structure of FIG. 11 but may have any other adequate structure. For example, a source address and a prefix length thereof may be included in the selection list 135. Series of operations performed by the relay apparatuses 102 are described below, with omission of explanation about the operations identical with those of the first embodiment. The following description refers to FIG. 1 with replacement of the relay apparatuses 100 by the relay apparatuses 102.

D2. Operations in Reception of Join Request

Series of operations performed by the relay apparatuses 102 in the network configuration of FIG. 1 are described below. The selection list 135 in each of relay apparatuses 102a and 102b stores the own relay apparatus IP address, the group prefix information with regard to a multicast group address of a multicast group assigned to the own relay apparatus, and the priority. The own relay apparatus IP address, the relevant group prefix information, and the priority may be set by the PIM-SM protocol processing module 110 or may be set by any other suitable technique. The PIM-SM protocol processing module 110 in each of the relay apparatuses 102a and 102b mutually sends a PIM Hello including the settings of the own relay apparatus IP address, the relevant group prefix information, and the priority and sets a relay apparatus IP address of the other apparatus, relevant group prefix information, and a priority in the own selection list 135. The PIM-SM protocol processing module 110 in each of the relay apparatuses 102a and 102b performs a relay apparatus selection process in response to reception of an IGMP/MLD Report from the receiving terminal 200.

D2-1. Relay Apparatus Selection Process

Figure 12:
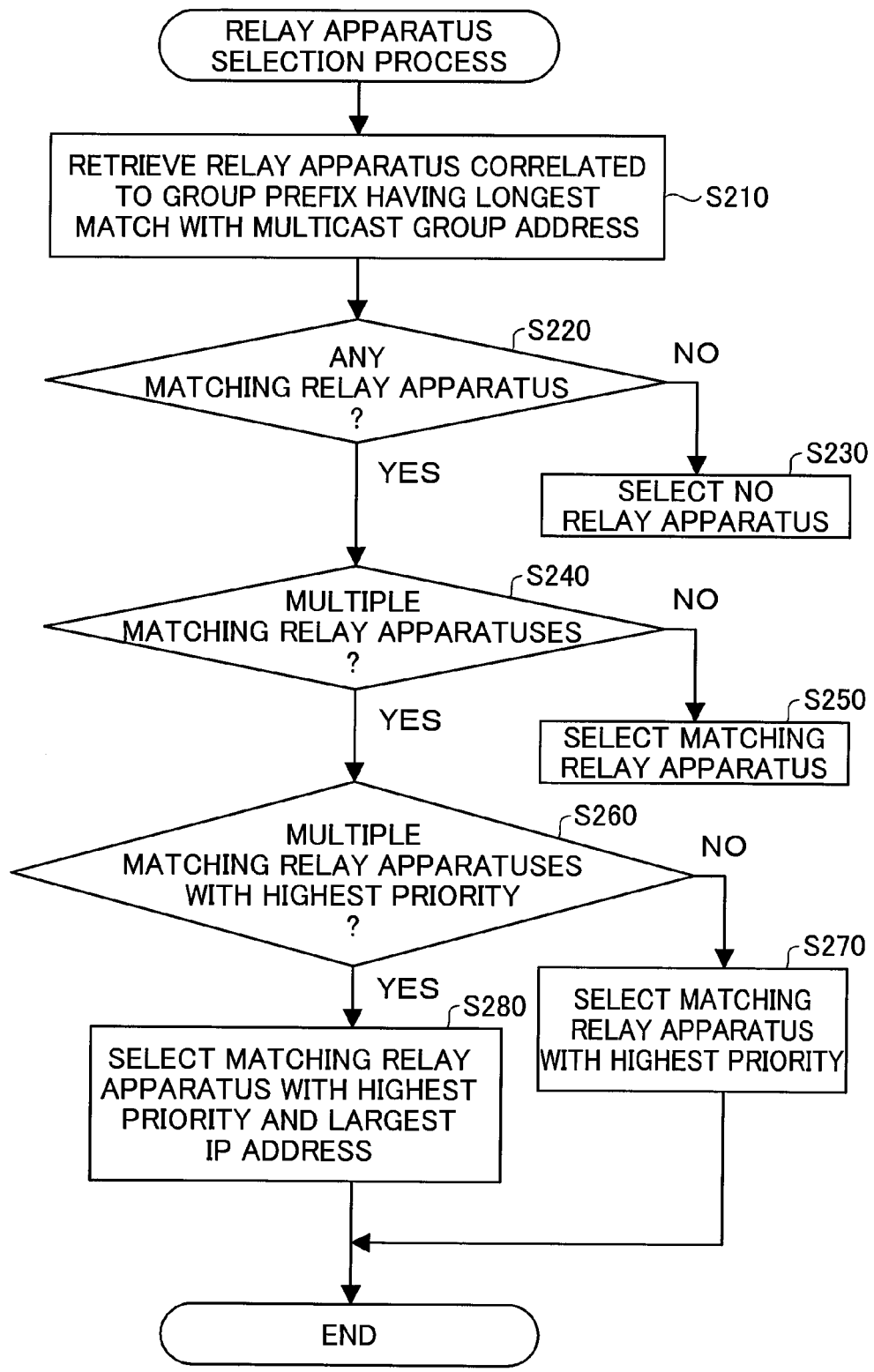
FIG. 12 is a flowchart showing a processing flow of relay apparatus selection performed in the fourth embodiment.

FIG. 12 is a flowchart showing a processing flow of relay apparatus selection performed in the fourth embodiment. The PIM-SM protocol processing module 110 compares a multicast group address included in an IGMP/MLD Report with the group prefix information stored in the selection list 135 and retrieves a relay apparatus correlated to group prefix information having a longest match with the multicast group address (step S210).

When the result of retrieval shows no matching relay apparatus in the selection list 135 (step S220: No), the PIM-SM protocol processing module 110 does not select any relay apparatus as the designated relay apparatus (step S230). When the result of retrieval shows only one matching relay apparatus in the selection list 135 (step S220: Yes and step S240: No), the PIM-SM protocol processing module 110 selects the matching relay apparatus as the designated relay apparatus (step S250). When the result of retrieval shows multiple matching relay apparatuses in the selection list 135 (step S220: Yes and step S240: Yes), the PIM-SM protocol processing module 110 compares the priorities of the multiple matching relay apparatuses (step S260). When there is only one relay apparatus having the highest priority (step S260: No), the PIM-SM protocol processing module 110 selects the relay apparatus having the highest priority as the designated relay apparatus (step S270). When there are multiple relay apparatuses having the highest priority (step S260: Yes), the PIM-SM protocol processing module 110 compares the relay apparatuses IP addresses of the multiple relay apparatuses having the highest priority and selects a relay apparatus having a largest relay apparatus IP address as the designated relay apparatus (step S280). The relay apparatus selection process terminates after selection of the designated relay apparatus at any of steps S250, S270, and S280 or non-selection of any designated relay apparatus at step S230. Series of operations performed in the case of addition of a relay apparatus and series of operations performed in the case of a stop of a relay apparatus in the fourth embodiment are similar to those of the first embodiment or those of the second embodiment except that the relay apparatus selection process of the fourth embodiment is performed instead of the relay apparatus selection process of the first embodiment or the second embodiment and are thus not specifically explained here.

In the network configuration of the fourth embodiment discussed above, the relay apparatus selection process performed by the technique other than computation of the hash values assures distribution of the processing load applied by the relay of multicast packets into the respective relay apparatuses. The relay apparatus selection process of the fourth embodiment may change the probability of specification of each relay apparatus as the designated relay apparatus assigned to relay a multicast packet. More specifically, different group prefix ranges may be set for the respective relay apparatuses in the selection list 135 stored in the relay apparatus of this embodiment. For example, a wider group prefix range or a higher priority may be set for a certain relay apparatus that is capable of establishing a greater number of multicast routes. Such setting increases the probability of selection of the certain relay apparatus as the designated relay apparatus assigned to relay a multicast packet, compared with the other relay apparatuses.

E. Fifth Embodiment

Figure 13:
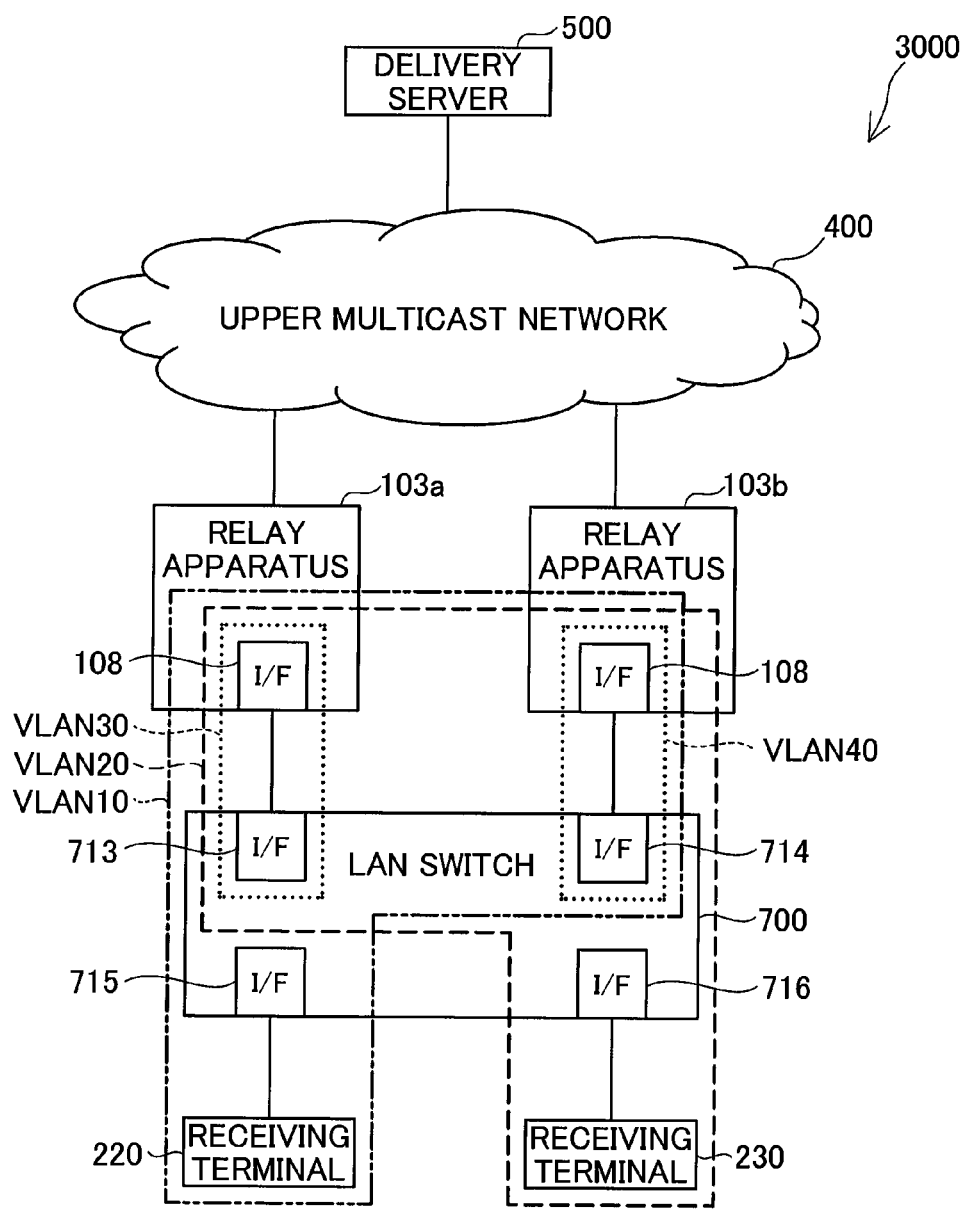
FIG. 13 is an explanatory diagrammatic representation of the general configuration of a network system including network relay apparatuses according to the fifth embodiment.

A fifth embodiment according to the invention describes one application of the invention utilizing the technique of Patent Document 1 (Japanese Patent Laid-Open No. 2008-79175). FIG. 13 is an explanatory diagrammatic representation of the general configuration of a network system 3000 including network relay apparatuses according to the fifth embodiment. The network system 3000 has two relay apparatuses 103a and 103b, two receiving terminals 220 and 230, a LAN switch 700, an upper multicast network 400, and a delivery server 500. The LAN switch 700 includes four interfaces (I/F) 713, 714, 715, and 716. The interface 713 connects with interfaces 108 of the relay apparatus 103a, and the interface 714 connects with interfaces 108 of the relay apparatus 103b. The interface 715 connects with an interface (not shown) of the receiving terminal 220, and the interface 716 connects with an interface (not shown) of the receiving terminal 230. The relay apparatuses 103a and 103b are respectively connected to the upper multicast network 400, which connects with the delivery server 500, by means of interfaces (not shown) different from the interfaces 108.

The receiving terminal 220 belongs to a VLAN 10, and the receiving terminal 230 belongs to a VLAN 20. The VLAN 10 and the VLAN 20 are multiplexed on lines connecting the two relay apparatuses 103a and 103b with the LAN switch 700. A VLAN 30 for multicast delivery is multiplexed on a line connecting the LAN switch 700 with the relay apparatus 103a. A VLAN 40 for multicast delivery is multiplexed on a line connecting the LAN switch 700 with the relay apparatus 103b.

FIG. 14 is an explanatory diagrammatic representation of the general structure of the relay apparatus 103 according to the fifth embodiment. The relay apparatus 103 of the fifth embodiment has the multiple interfaces 108, a frame transmitting/receiving module 109, a routing table 180, and a routing processing module 190, in addition to the components of the relay apparatus 100 of the first embodiment with omission of the multicast route table 120. The frame transmitting/receiving module 109 functions to forward frames received via the interfaces 108 to the respective processing modules 110, 150, and 190 according to the frame types and send data forwarded from the respective processing modules 110, 150, and 190 via the interfaces 108 in the form of frames.

FIG. 15 is an explanatory diagrammatic representation of the routing table 180. As shown in FIG. 15, the routing table 180 of the fifth embodiment is set to correlate each multicast group address to output information including an output interface and an output VLAN. The routing processing module 190 functions to manage the routing table 180. The routing processing module 190 of this embodiment is equivalent to the 'setter' in the claims of the invention.

Figures 16, 17:
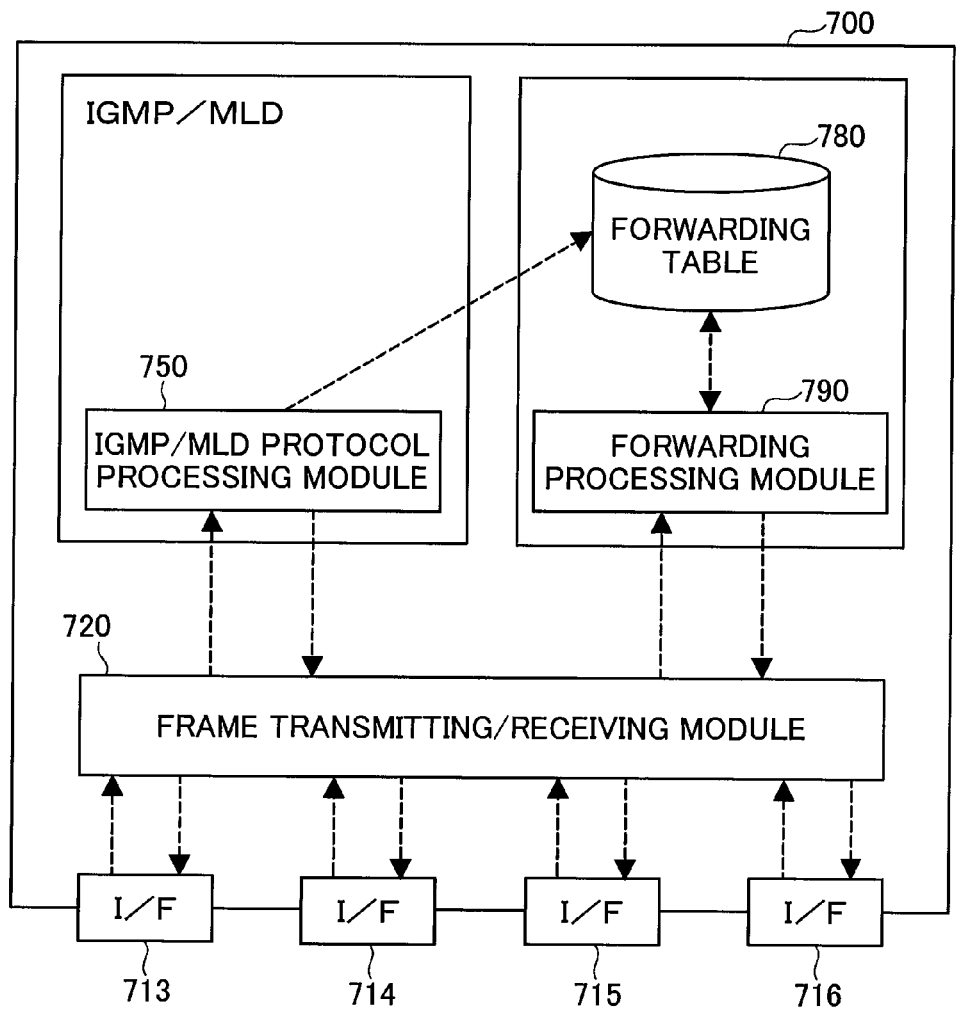
FIG. 16 is an explanatory diagrammatic representation of the membership database.
FIG. 17 is an explanatory diagrammatic representation of the general structure of the LAN switch.

FIG. 16 is an explanatory diagrammatic representation of the membership database 160. As shown in FIG. 16, the membership database 160 of the fifth embodiment is set to correlate each receiving interface to a VLAN and a multicast group address. The PIM-SM protocol processing module 110 of each relay apparatus 103 sends a PIM Hello to the VLAN 10 and to the VLAN 20 and records a relay apparatus IP address with regard to each VLAN, which is included in a PIM Hello mutually received from another relay apparatus 103, into the own relay apparatus IP address list 130.

FIG. 17 is an explanatory diagrammatic representation of the general structure of the LAN switch 700. The LAN switch 700 has four interfaces 713, 714, 715, and 716, a frame transmitting/receiving module 720, an IGMP/MLD protocol processing module 750, a forwarding table 780, and a forwarding processing module 790. The frame transmitting/receiving module 720 has the similar functions to those of the frame transmitting/receiving module 109 of the relay apparatus 103. The IGMP/MLD protocol processing module 750 functions to process IGMP/MLD messages, like the IGMP/MLD protocol processing module 150 of the first embodiment. The IGMP/MLD protocol processing module 750 receives an IGMP/MLD Report as a join request for a preset multicast group from a receiving terminal and records information obtained from the received IGMP?MLD Report into the forwarding table 780.

FIG. 18 is an explanatory diagrammatic representation of the forwarding table 780. As shown in FIG. 18, the forwarding table 780 is set to correlate an input VLAN to a destination MAC address and output information including an output interface and an output VLAN. The destination MAC address is generated as a multicast MAC address from a multicast group address. For example, a destination MAC address of a multicast frame has upper 25 bits of '0000:0001:0000:0000:0101:1110:0' and remaining lower bits as duplicate of the lower 23 bits of its multicast group address. The forwarding processing module 790 functions to manage the forwarding table 780.

E2. Operations in Reception of Join Request

Series of operations performed in response to transmission of a join request for a preset multicast group (having, for example, a multicast group address G1) from the receiving terminal 220 are described first. When the LAN switch 700 receives an IGMP/MLD Report from the receiving terminal 220, the IGMP/MLD protocol processing module 750 records information obtained from the received IGMP/MLD Report into the forwarding table 780. More specifically as shown in FIG. 18, the IGMP/MLD protocol processing module 750 sets the ULAN which the receiving terminal 220 belongs to, a destination MAC address M1 generated from the multicast group address G1, the interface 715 receiving the join request from the receiving terminal 220, and the VLAN 10 which the receiving terminal 220 belongs to, respectively as the input VLAN, the destination MAC address, the output interface, and the output VLAN in the forwarding table 780. The LAN switch 700 forwards the received join request to the two relay apparatuses 103a and 103b.

The IGMP/MLD protocol processing module 150 in each of the relay apparatuses 103a and 103b adds multicast group information obtained from the received IGMP/MLD Report to the membership database 160. More specifically as shown in FIG. 16, the IGMP/MLD protocol processing module 150 sets the interface 108 receiving the join request from the receiving terminal 220, the VLAN 10 which the receiving terminal 220 belongs to, and the multicast group address G1 of the preset multicast group as the target of the join request made by the receiving terminal 220, respectively as the receiving interface, the VLAN, and the multicast group address in the membership database 160. The relay apparatus selection module 140 in each of the relay apparatuses 103a and 103b then starts a relay apparatus selection process. The relay apparatus IP addresses of the respective relay apparatuses 103a and 103b in the VLAN 10 recorded in the relay apparatus IP address list 130 are used for the relay apparatus selection process.

The routing processing module 190 in either the relay apparatus 103a or the relay apparatus 103b selected as a designated relay apparatus by the relay apparatus selection process sets a multicast route in the routing table 180. More specifically as shown in FIG. 15, the routing processing module 190 sets the multicast group address G1 of the preset multicast group as the target of the join request made by the receiving terminal 220, the interface 108 receiving the join request, and the VLAN 10 which the receiving terminal 220 belongs to, respectively as the multicast group address, the output interface, and the output VLAN in the routing table 180. When the relay apparatus 103a or 103b selected as the designated relay apparatus receives the destination MAC address M1 and a multicast frame having the multicast group address G1 from the delivery server 500, the routing processing module 190 of the designated relay apparatus relays the received multicast frame. More specifically, the routing processing module 190 refers to the routing table 180 and sends the received multicast frame from the output interface 108 to the LAN switch 700 across the VLAN 10. The routing table 180 stored in the relay apparatus 103 not selected as the designated relay apparatus by the relay apparatus selection process has no setting of the multicast route with regard to the multicast frame to be relayed by the other relay apparatus 103 selected as the designated relay apparatus. The routing processing module 190 in the relay apparatus 103 not selected as the designated relay apparatus accordingly does not relay the received multicast frame.

When the LAN switch 700 receives the destination MAC address M1 and the multicast frame having the multicast group address G1 from the relay apparatus 103a or 103b selected as the designated relay apparatus by the relay apparatus selection process, the forwarding processing module 790 of the LAN switch 700 refers to the forwarding table 780 and sends the received multicast frame from the interface 715 to the receiving terminal 220 across the VLAN 10. This series of operations is performed in response to reception of a join request from the receiving terminal 220.

Series of operations performed in response to transmission of a join request for the preset multicast group (having, for example, the multicast group address G1) from the receiving terminal 230 after transmission of the join request from the receiving terminal 220 are described below. FIGS. 19A and 19B are explanatory diagrammatic representations of the forwarding table 780 with some information added. When the LAN switch 700 receives an IGMP/MLD Report from the receiving terminal 230, the IGMP/MLD protocol processing module 750 of the LAN switch 700 adds information obtained from the join request received from the receiving terminal 230 to the forwarding table 780 of FIG. 19A having the registry of information obtained from the join request received from the receiving terminal 220. More specifically as shown in FIG. 19B, the IGMP/MLD protocol processing module 750 sets the VLAN 20 which the receiving terminal 230 belongs to, the destination MAC address M1 generated from the multicast group address G1, the interface 716 receiving the join request from the receiving terminal 230, and the VLAN 20 which the receiving terminal 230 belongs to, respectively as the input VLAN, the destination MAC address, the output interface, and the output VLAN in the forwarding table 780. The LAN switch 700 forwards the received join request to the two relay apparatuses 103a and 103b.

Figure 20:
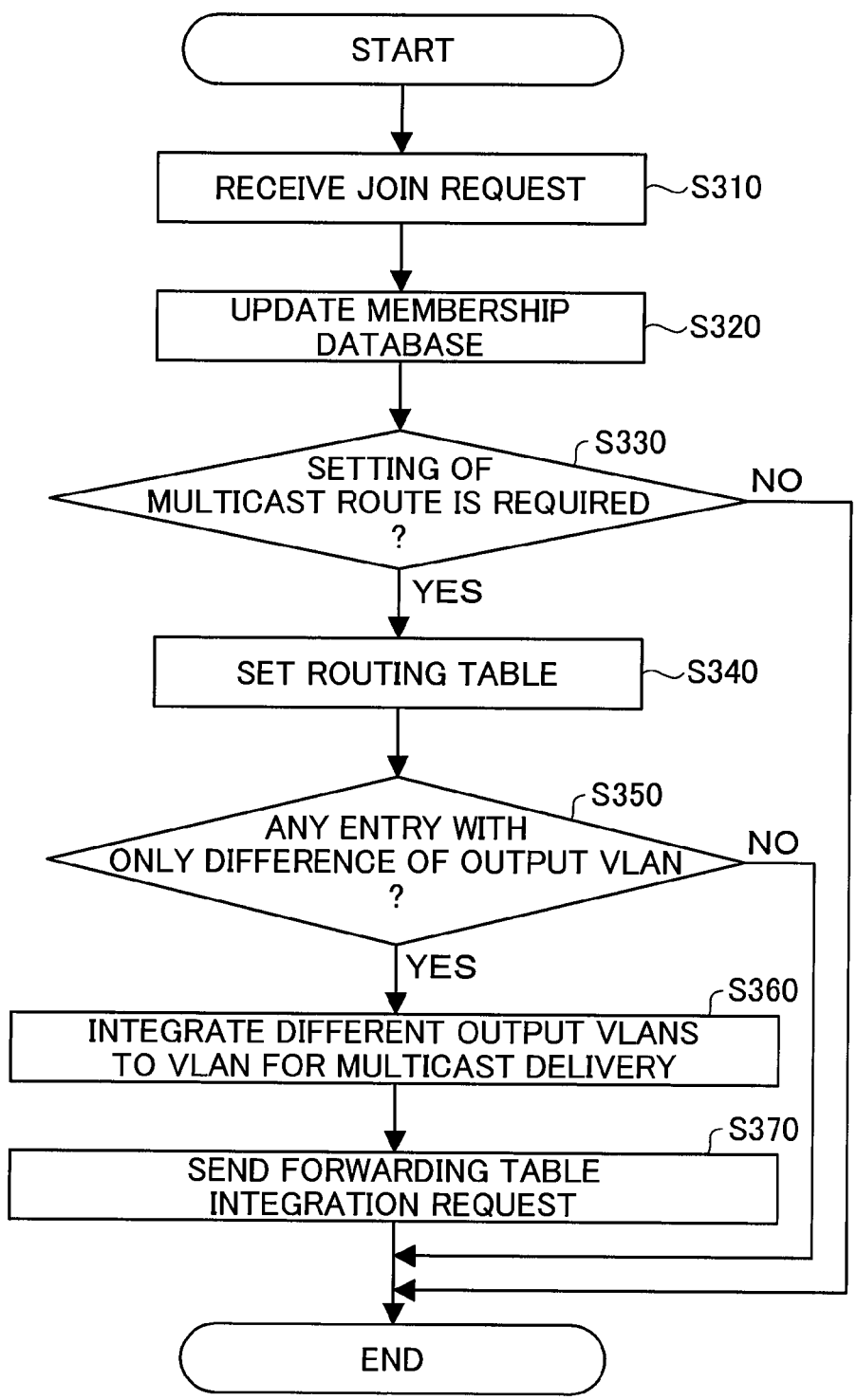
FIG. 20 is a flowchart showing series of operations performed by the relay apparatuses in response to sequential reception of join requests from the two receiving terminals belonging to the different VLANs.

FIG. 20 is a flowchart showing series of operations performed by the relay apparatuses 103a and 103b in response to sequential reception of join requests from the two receiving terminals 220 and 230 belonging to the different VLANs. FIGS. 21A and 21B are explanatory diagrammatic representations of the membership database 160 with some information added. When each of the relay apparatuses 103a and 103b receives a join request from the LAN switch 700 (step S310), the IGMP/MLD protocol processing module 150 adds information obtained from the received join request from the receiving terminal 230 to the membership database 160 of FIG. 21A having the registry of information obtained from the received join request from the receiving terminal 220 (step S320). More specifically as shown in FIG. 21B, the IGMP/MLD protocol processing module 150 sets the interface 108 receiving the join request from the receiving terminal 230, the VLAN 20 which the receiving terminal 230 belongs to, and the multicast group address G1 of the preset multicast group as the target of the join request made by the receiving terminal 230, respectively as the receiving interface, the VLAN, and the multicast group address in the membership database 160.

The relay apparatus selection module 140 in each of the relay apparatuses 103a and 103b then starts the relay apparatus selection process. Among the relay apparatus IP addresses of the respective relay apparatuses 103 recorded in the relay apparatus IP address list 130, the relay apparatus IP address of the VLAN identical with the relay apparatus IP address of the VLAN used in the relay apparatus selection process performed in response to reception of a join request from the receiving terminal 220 is used for the relay apparatus selection process performed in response to reception of a join request from the receiving terminal 230. In the network configuration of the fifth embodiment, the relay apparatus selection module 140 performs the relay apparatus selection process with the relay apparatus IP addresses of the respective relay apparatuses in the VLAN 10 recorded in the relay apparatus IP address list 130. In the relay apparatus selection process performed in response to sequential reception of join requests from multiple receiving terminals belonging to different VLANs, the relay apparatus selection module 140 utilizes the relay apparatus IP addresses of the respective relay apparatuses in one identical VLAN. Any arbitrary method may be adopted to identify the VLAN used for the relay apparatus selection process. A desired VLAN may be set in advance to be used for the relay apparatus selection process. Alternatively a specific VLAN which a receiving terminal sending a join request first belongs to may be set to be used for the relay apparatus selection process.

When the relay apparatus 103 is not selected as the designated relay apparatus by the relay apparatus selection process and does not require the additional setting of a multicast route in the routing table 180 (step S330: No), the relay apparatus 103 terminates this processing routine triggered by reception of the join request. When the relay apparatus 103 is selected as the designated relay apparatus by the relay apparatus selection process and requires the additional setting of a multicast route (step S330: Yes), the routing processing module 190 additionally sets a multicast route in the routing table 180 (step S340).

FIG. 22A through 22C are explanatory diagrammatic representations of the routing table 180 with the additional setting of a multicast route. The routing processing module 190 of the relay apparatus 103 selected as the designated relay apparatus by the relay apparatus selection process records the additional setting of the multicast route in the routing table 180 of FIG. 22A having an entry with the setting of a multicast route in response to the join request from the receiving terminal 220. More specifically as shown in FIG. 22B, the multicast group address G1 of the multicast route set in response to the join request sent from the receiving terminal 220 is identical with the multicast group address G1 of the preset multicast group as the target of the join request made by the receiving terminal 230, so that the routing processing module 190 adds the output information of the additionally set multicast route to the existing entry having the multicast group address G1.

The routing processing module 190 searches the routing table 180 for any entry of the identical multicast group address having the only difference of the output VLAN in the respective registries of the output information (step S350). When there is any matching entry (step S350: Yes), the routing processing module 190 integrates the different output VLANs included in the respective registries of the output information into one VLAN for multicast delivery in the routing table 180 (step S360). More specifically, the two registries of the output information in the entry of the identical multicast group address G1 in the routing table 180 have the same output interface 108 but the different output VLANs, the VLAN 10 and the VLAN 20, as shown in FIG. 22B. The routing processing module 190 integrates these two registries of the output information into one registry of the output information including the VLAN 30 for multicast delivery as the output VLAN in the routing table 180 as shown in FIG. 22C. The routing processing module 190 refers to the routing table 180 and sends a multicast frame of the multicast group address G1 from the output interface 108 to the LAN switch 700 across the VLAN 30.

After integration of the multiple registries of the output information in the routing table 180, the relay apparatus 103 sends a forwarding table integration request to the LAN switch 700 (step S370). The forwarding integration request includes a multicast group address, VLAN information before the integration, and VLAN information after the integration. This series of operations is performed in response to reception of a join request from the receiving terminal 230 subsequent to reception of a join request from the receiving terminal 220.

FIGS. 23A and 23B are explanatory diagrammatic representations of the forwarding table 780 with integration of information. When receiving a forwarding table integration request, the LAN switch 700 searches the forwarding table 780 for any entry having the destination MAC address M1, which is generated from the multicast group address G1 obtained from the received forwarding table integration request, and the VLAN information before the integration (the VLAN 10 or the VLAN 20 as the output VLAN) obtained from the received forwarding table integration request. In the illustrated example, the forwarding table 780 has two matching entries as shown in FIG. 23A. The forwarding processing module 790 of the LAN switch 700 sets one new entry including the two registries of the output information included in the two matching entries, the destination MAC address M1, and the input VLAN 30 as shown in FIG. 23B, and deletes the two original entries shown in FIG. 23A. Series of operations performed in the case of addition of a relay apparatus and series of operations performed in the case of a stop of a relay apparatus in the fifth embodiment are similar to those of the first embodiment or those of the second embodiment except that the relay apparatus selection process of the fifth embodiment is performed instead of the relay apparatus selection process of the first embodiment or the second embodiment and are thus not specifically explained here.

The network configuration of the fifth embodiment discussed above assures distribution of the processing load applied by the relay of multicast packets to multiple receiving terminals belonging to different VLANs into the respective relay apparatuses. More specifically, even when join requests are received from multiple receiving terminals belonging to different VLANs, the relay apparatus selection process of this embodiment utilizes the relay apparatus IP addresses of the respective relay apparatuses in one identical VLAN. The same multicast group address gives the same hash value. This arrangement accordingly prevents different relay apparatuses from being selected as the designated relay apparatus assigned to relay multicast frames to the identical multicast group address in the individual VLANs. Only one VLAN for multicast delivery may be used for the relay of the multicast frames to the identical multicast group address. This arrangement effectively reduces the overall multicast traffic in the network system 3000.

F. Other Aspects

The invention is not limited to any of the embodiments and their applications discussed above but may be actualized in diversity of other embodiments and applications within the scope of the invention. Some examples of possible modification are given below.

F1. MODIFIED EXAMPLE 1

In the embodiments discussed above, the relay apparatus selection process is performed with the multicast group address as the key. Any other address may be used as the key in the relay apparatus selection process. In a modified network configuration including multiple delivery servers 500 for multicast packet to be relayed to one identical multicast group address, an IP address of each delivery server 500 may be used as the key in the relay apparatus selection process. This arrangement enables the load of setting multicast routes to be distributed into multiple relay apparatuses.

F2. MODIFIED EXAMPLE 2

The above embodiments describe the series of operations performed by the relay apparatus selection module 140 when a relay apparatus newly joins in the network. The relay apparatus selection process performs the similar series of operations in the case where some of multiple relay apparatuses connecting with the network goes down and is activated again, as in the case of addition of a relay apparatus to the network.

F3. MODIFIED EXAMPLE 3

In the embodiments discussed above, each relay apparatus utilizes a PIM Hello to detect addition of any relay apparatus or stop of any relay apparatus. The PIM Hello-based technique can detect stop of a relay apparatus only after the query timeout. This may undesirably extend the down time of multicast relay. Any other suitable technique for detecting addition or stop of any relay apparatus may thus be adopted to detect stop of a relay apparatus at an earlier timing and thereby shorten the down time of multicast relay.

The embodiments and their modified examples discussed above are to be considered in all aspects as illustrative and not restrictive. There may be many other modifications, changes, and alterations without departing from the scope or spirit of the main characteristics of the present invention. Part or all of the structures and the functions actualized by the hardware devices, modules or units in the above embodiments may be accomplished by the software configuration. Part or all of the functions implemented by the software modules in the above embodiments may be accomplished by the hardware configuration. All changes within the meaning and range of equivalency of the claims are intended to be embraced therein. The scope and spirit of the present invention are indicated by the appended claims, rather than by the foregoing description.

What is claimed is:

1. A network relay apparatus connecting with a network, the network relay apparatus comprising:
   a relay apparatus selector configured to, in response to direct or indirect reception of a join request for a preset multicast group from an external device connecting with the network, refer to
   information for identifying respective network relay apparatuses on a segment which the own network relay apparatus belongs to, and,
   at least one of information for identifying the preset multicast group and information for identifying a source, wherein the information for identifying the preset multicast group and the information for identifying a source are included in the received join request, and
   unequivocally select one network relay apparatus among at least part of the network relay apparatuses on the segment as a designated network relay apparatus according to a predetermined rule, wherein the designated network relay apparatus is assigned to relay a multicast packet to the external device; and
   a setter configured, when the own network relay apparatus is selected as the designated network relay apparatus by the relay apparatus selector, to set a multicast route for relaying the multicast packet to the external device, and when the own network relay apparatus is not selected as the designated relay apparatus by the relay apparatus selector, not to set the multicast route for relaying the multicast packet to the external device,
   wherein, upon detection of addition of another network relay apparatus on the segment, the relay apparatus selector is configured to refer to:
   information for identifying respective network relay apparatuses on the segment including the added network relay apparatus, and
   at least one of information for identifying a multicast group which the external device participates in and information for identifying a source of delivering a multicast packet to be sent to the external device; and
   to select again one network relay apparatus among all the network relay apparatuses on the segment including the added network relay apparatus, as the designated network relay apparatus assigned to relay the multicast packet to the external device.

2. The network relay apparatus in accordance with claim 1, wherein upon detection of stoppage of a network relay apparatus on the segment, the relay apparatus selector is configured also to refer to:
information for identifying respective network relay apparatuses on the segment excluding the stopped network relay apparatus, and
at least one of information for identifying a multicast group, which the external device participates in and is allocated for multicast relay to the stopped network relay apparatus, and information for identifying a source of delivering a multicast packet to be sent to the external device; and
to select again one network relay apparatus among all the network relay apparatuses on the segment excluding the stopped network relay apparatus, as a designated network relay apparatus assigned to relay the multicast packet to the external device.

3. The network relay apparatus in accordance with claim 1, the network relay apparatus being arranged between a downstream network connecting with the external device and an upstream network connecting with a source, wherein in response to direct or indirect reception of a join request for a preset multicast group made by the external device from a downstream segment which the own network relay apparatus belongs to, the relay apparatus selector is configured also to refer to:
information for identifying respective network relay apparatuses on an upstream segment which the own network relay apparatus belongs to, and
at least one of information for identifying a multicast group and information for identifying a source, which are included in the received join request, and
unequivocally to select one network relay apparatus among all the network relay apparatuses other than the own network relay apparatus on the upstream segment according to a predetermined rule, as a designated network relay apparatus assigned to relay a multicast packet to the external device.

4. The network relay apparatus in accordance with claim 3, wherein upon detection of addition of another network relay apparatus on the upstream segment, the relay apparatus selector is configured also to refer to:
information for identifying respective network relay apparatuses on the upstream segment including the added network relay apparatus, and
at least one of information for identifying a multicast group which the external device participates in and information for identifying a source of delivering a multicast packet to be sent to the external device: and
to select again one network relay apparatus among all the network relay apparatuses other than the own network relay apparatus on the upstream segment including the added network relay apparatus, as the designated network relay apparatus assigned to relay the multicast packet to the external device.

5. The network relay apparatus in accordance with claim 3, wherein upon detection of stoppage of a network relay apparatus on the upstream segment, the relay apparatus selector is configured also to refer to:
information for identifying respective network relay apparatuses on the upstream segment excluding the stopped network relay apparatus, and
at least one of information for identifying a multicast group, which the external device participates in and is allocated for multicast relay to the stopped network relay apparatus, and information for identifying a source of delivering a multicast packet to be sent to the external device; and
to select again one network relay apparatus among all the network relay apparatuses other than the own network relay apparatus on the upstream segment excluding the stopped network relay apparatus, as a designated network relay apparatus assigned to relay the multicast packet to the external device.

6. The network relay apparatus in accordance with claim 1, further including:
a first storage configured to store a correspondence list of correlating each network relay apparatus on the segment to information for identifying a multicast packet as an object of relay by the network relay apparatus, wherein when the correspondence list does not have any entry of a network relay apparatus correlated to information for identifying a multicast packet as a receiving object to be received by the external device, the relay apparatus selector performs selection of the designated network relay apparatus.

7. The network relay apparatus in accordance with claim 6, further including:
a transmitter configured to, upon detection of addition of another network relay apparatus on the segment, send the correspondence list to the added network relay apparatus.

8. The network relay apparatus in accordance with claim 6, wherein upon detection of stoppage of a network relay apparatus on the segment, when the correspondence list includes information for identifying a multicast packet specified as an object of relay by the stopped network relay apparatus, the relay apparatus selector is configured to select again only a designated relay apparatus assigned to relay the multicast packet specified as the object of relay by the stopped network relay apparatus.

9. The network relay apparatus in accordance with claim 6, the network relay apparatus being arranged between a downstream network connecting with the external device and an upstream network connecting with a source, wherein in response to direct or indirect reception of a join request for a preset multicast group made by the external device from a downstream segment which the own network relay apparatus belongs to, when the correspondence list does not have any entry of a network relay apparatus correlated to information for identifying a multicast packet as a receiving object to be received by the external device, the relay apparatus selector is configured to perform the selection of the designated network relay apparatus among all the network relay apparatuses other than the own network relay apparatus on an upstream segment.

10. The network relay apparatus in accordance with claim 9, further including:
an updater configured to, in response to reception of a result of the selection of the designated network relay apparatus from another network relay apparatus on the downstream segment which the own network relay apparatus belongs to, adds the received result of the selection to the correspondence list stored in the own network relay apparatus.

11. The network relay apparatus in accordance with claim 9, wherein upon detection of stoppage of a network relay apparatus on the upstream segment, when the correspondence list includes information for identifying a multicast packet specified as an object of relay by the stopped network relay apparatus, the relay apparatus selector is configured to select again only a designated relay apparatus assigned to relay the multicast packet specified as the object of relay by the stopped network relay apparatus among all the network relay apparatuses other than the own network relay apparatus on the upstream segment excluding the stopped network relay apparatus.

12. The network relay apparatus in accordance with claim 1, further including:
a second storage configured to store a selection list of correlating each network relay apparatus on the segment to a priority order of specification as the designated network relay apparatus assigned to relay the multicast packet to the external device, wherein the relay apparatus selector is configured to perform selection of the designated network relay apparatus according to the selection list.

13. The network relay apparatus in accordance with claim 1, wherein the relay apparatus selector is configured to perform selection of the designated network relay apparatus, based on computed values by hash computation from the at least one of the information for identifying the preset multicast group and the information for identifying the source and the information for identifying the respective network relay apparatuses.

14. A network system, comprising:
a forwarding device connected respectively with a first external device belonging to a first virtual network and with a second external device belonging to a second virtual network; and
multiple network relay apparatuses belonging to one identical segment in each of the first virtual network and the second virtual network,
each of the multiple network relay apparatuses comprising:
a relay apparatus selector configured to, in response to direct or indirect reception of join requests for one identical multicast group from both the first external device and the second external device, refer to
information for identifying respective network relay apparatuses in the first virtual network, and,
at least one of information for identifying the multicast group and information for identifying a source, wherein the information for identifying the multicast group and the information for identifying a source are included in the received join requests, and
unequivocally select one network relay apparatus among at least part of the network relay apparatuses as a designated network relay apparatus according to a predetermined rule, wherein the designated network relay apparatus is assigned to relay a multicast packet to the first external device and to the second external device; and
a setter configured, when the own network relay apparatus is selected as the designated network relay apparatus by the relay apparatus selector, to set multicast routes for relaying the multicast packet to the first external device and to the second external device, and when the own network relay apparatus is not selected as the designated relay apparatus by the relay apparatus selector, not to set the multicast routes for relaying the multicast packet to the first external device and to the second external device, wherein, upon detection of addition of another network relay apparatus on the segment, the relay apparatus selector is configured to refer to:
information for identifying respective network relay apparatuses on the segment including the added network relay apparatus; and
at least one of information for identifying a multicast group which the external device participates in and information for identifying a source of delivering a multicast packet to be sent to the external device; and
to select again one network relay apparatus among all the network relay apparatuses on the segment including the added network relay apparatus, as the designated network relay apparatus assigned to relay the multicast packet to the external device.

15. A network system, comprising:
multiple network relay apparatuses connecting with one identical segment on a network; and
an external device connecting with the network,
each of the multiple network relay apparatuses comprising:
a relay apparatus selector configured to, in response to direct or indirect reception of a join request for a preset multicast group from the external device, refer to
information for identifying the multiple network relay apparatuses, and
at least one of information for identifying the preset multicast group and information for identifying a source, wherein the information for identifying the preset multicast group and the information for identifying a source are included in the received join request, and
unequivocally select one network relay apparatus among the multiple network relay apparatuses as a designated network relay apparatus according to a predetermined rule, wherein the designated network relay apparatus is assigned to relay a multicast packet to the external device; and
a setter configured, when the own network relay apparatus is selected as the designated network relay apparatus by the relay apparatus selector, to set a multicast route for relaying the multicast packet to the external device, and when the own network relay apparatus is not selected as the designated relay apparatus by the relay apparatus selector, not to set the multicast route for relaying the multicast packet to the external device,
wherein, upon detection of addition of another network relay apparatus on the segment, the relay apparatus selector is configured to refer to:
information for identifying respective network relay apparatuses on the segment including the added network relay apparatus, and
at least one of information for identifying a multicast group which the external device participates in and information for identifying a source of delivering a multicast packet to be sent to the external device; and
to select again one network relay apparatus among all the network relay apparatuses on the segment including the added network relay apparatus, as the designated network relay apparatus assigned to relay the multicast packet to the external device.

* * * * *